US012716286B2

(12) United States Patent
Seymour et al.

(10) Patent No.: US 12,716,286 B2
(45) Date of Patent: Aug. 25, 2026

(54) MOVABLE DOOR SYSTEM USABLE WITH ENERGY HARVESTING HANDICAP SWITCH

(71) Applicant: OVERHEAD DOOR CORPORATION, Lewisville, TX (US)

(72) Inventors: Daniel Seymour, Durham, CT (US); Kevin D. Banta, Orem, UT (US)

(73) Assignee: Overhead Door Corporation, Lewisville, TX (US)

( * ) Notice: Subject to any disclaimer, the term of this patent is extended or adjusted under 35 U.S.C. 154(b) by 50 days.

(21) Appl. No.: 18/676,684

(22) Filed: May 29, 2024

(65) Prior Publication Data

US 2025/0369276 A1 Dec. 4, 2025

(51) Int. Cl.
*E05F 15/77* (2015.01)
*H02N 2/18* (2006.01)

(52) U.S. Cl.
CPC ............. *E05F 15/77* (2015.01); *H02N 2/186* (2013.01)

(58) Field of Classification Search
CPC ................................ H02N 2/186; E05F 15/77
See application file for complete search history.

(56) References Cited

U.S. PATENT DOCUMENTS

| | | | | |
|---|---|---|---|---|
| 4,660,324 A * | 4/1987 | Nyenbrink | E05F 15/63 | 49/340 |
| 5,878,530 A * | 3/1999 | Eccleston | E05F 15/63 | 49/340 |
| 6,967,587 B2 * | 11/2005 | Snell | E05F 3/224 | 340/925 |
| 2002/0070635 A1 | 6/2002 | Morrison | | |
| 2015/0325778 A1 * | 11/2015 | Furukawa | H02N 2/186 | 310/26 |
| 2017/0047866 A1 * | 2/2017 | Furukawa | H02N 2/00 | |
| 2018/0254720 A1 * | 9/2018 | Ohishi | H03K 17/964 | |
| 2019/0386554 A1 * | 12/2019 | Villaret | H02K 11/225 | |
| 2020/0024898 A1 * | 1/2020 | Eichstetter | E06B 9/68 | |
| 2020/0112240 A1 * | 4/2020 | Nakamura | H02N 2/186 | |
| 2021/0090427 A1 * | 3/2021 | Hass | G08B 25/006 | |
| 2024/0022185 A1 * | 1/2024 | Wu | H02N 2/18 | |

* cited by examiner

*Primary Examiner* — Gregory J Strimbu
(74) *Attorney, Agent, or Firm* — Haynes and Boone, LLP

(57) ABSTRACT

A system includes a movable barrier and a barrier operating system configured to move the movable barrier between open and closed positions. The barrier operating system includes a handicap switch operably coupled to the movable barrier and powered with an energy harvester. The barrier operating system also includes a controller. The controller is configured to receive a signal from the handicap switch and change, in response to the signal, movement of the movable barrier between the open and closed positions.

20 Claims, 15 Drawing Sheets

MOVABLE DOOR SYSTEM USABLE WITH ENERGY HARVESTING HANDICAP SWITCH

CROSS-REFERENCE TO RELATED APPLICATION

The present disclosure is related to U.S. application Ser. No. 18/676,634, titled MOVABLE DOOR SYSTEM USABLE WITH ENERGY HARVESTING BREAKOUT SWITCH, filed May 29, 2024.

FIELD

The present disclosure relates to movable barrier systems, and more particularly to movable barrier handicap switch devices, systems, and methods.

BACKGROUND

Movable barriers, such as sliding doors, swinging doors, revolving doors, upward-acting doors, rollup doors, and slidable and swingable gates, are used to alternatively allow and restrict entry to building structures and property. The structure and motion (e.g., sliding, swinging, revolving, etc.) of movable barriers make wired connections and certain types of switches difficult to integrate. Some movable barriers have a remote switch that sends signals from the switch to the movable barrier to communicate a command or signal to open the door. For example, a handicap switch may be placed on a wall spaced from the movable barrier, but in communication with the movable barrier system. In some implementations, such a handicap switch may be placed where a power source is not present or can be accessed only with difficulty. Where battery power sources may be utilized, batteries sometimes need charging or replacement. The present disclosure describes devices, systems, and methods that address or overcome one or more shortcomings of conventional systems.

SUMMARY

The examples of the invention are summarized by the claims that follow the description.

Consistent with some examples, a system may comprise a movable barrier and a barrier operating system configured to move the movable barrier between open and closed positions. The barrier operating system may comprise a handicap switch operably coupled to the movable barrier and powered with an energy harvester and a controller. The controller may be configured to receive a signal from the handicap switch and change, in response to the signal, movement of the movable barrier between the open and closed positions.

In some examples, change the movement of the movable barrier may include starting the movement, halting the movement, slowing the movement, accelerating the movement, reversing the movement, or pausing the movement. The energy harvester may harvest energy from kinetic energy generated by a biasing element from a mechanical force applied to an input surface of the handicap switch. The biasing element may be deformed by the mechanical force applied to the input surface to generate the kinetic energy.

In some examples, the handicap switch is configured to wirelessly transmit the signal to the controller. The signal may be wirelessly transmitted to the controller before or at the same time as the harvested energy reaches a threshold amount. The handicap switch may be coupled to a wall, wherein the wall is isolated from the movable barrier.

Consistent with some examples, a method may comprise moving a movable barrier between open and closed positions using a barrier operating system, the barrier operating system comprising a handicap switch and a controller, the handicap switch operably coupled to the movable barrier. The method may further comprise powering the handicap switch with an energy harvester, receiving a signal at the controller from the handicap switch powered with the energy harvester, and changing, in response to the signal, movement of the movable barrier between the open and closed positions.

In some examples, changing the movement of the movable barrier may include starting the movement, halting the movement, slowing the movement, accelerating the movement, reversing the movement, or pausing the movement. The method may further comprise harvesting energy with the energy harvester from kinetic energy generated by a biasing element from a mechanical force applied to an input surface of the handicap switch. The biasing element may be deformed by the mechanical force applied to the input surface to generate the kinetic energy. In some examples, the method may further comprise wirelessly transmitting the signal to the controller with the handicap switch. The signal may be transmitted to the controller before or at the same time as the harvested energy reaches a threshold amount.

Consistent with some examples, a handicap switch may be operably couplable to a movable barrier movable by a barrier operating system between open and closed positions, the barrier operating system comprising a controller. The handicap switch may comprise an energy harvester configured to convert kinetic energy into electrical energy and a transmitter powered by the electrical energy and configured to wirelessly send a signal to the controller.

In some examples, the handicap switch further comprises a biasing element configured to generate the kinetic energy from a mechanical force applied to an input surface of the handicap switch. The energy harvester may include a piezoelectric material deformable by the mechanical force applied to the input surface to generate the electrical energy. The energy harvester may include a coil and at least one magnet movable by the mechanical force applied to the input surface to generate the electrical energy.

In some examples, the signal causes the controller to change movement of the movable barrier between the open and closed positions, and change the movement of the movable barrier includes starting the movement, halting the movement, slowing the movement, accelerating the movement, reversing the movement, or pausing the movement. The signal may be wirelessly transmitted to the controller before or at the same time as the harvested energy reaches a threshold amount. The handicap switch may be coupled to a wall isolated from the movable barrier.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

The accompanying drawings illustrate examples of the systems, devices, and methods disclosed herein and together with the description, serve to explain the principles of the present disclosure.

Figure 1:
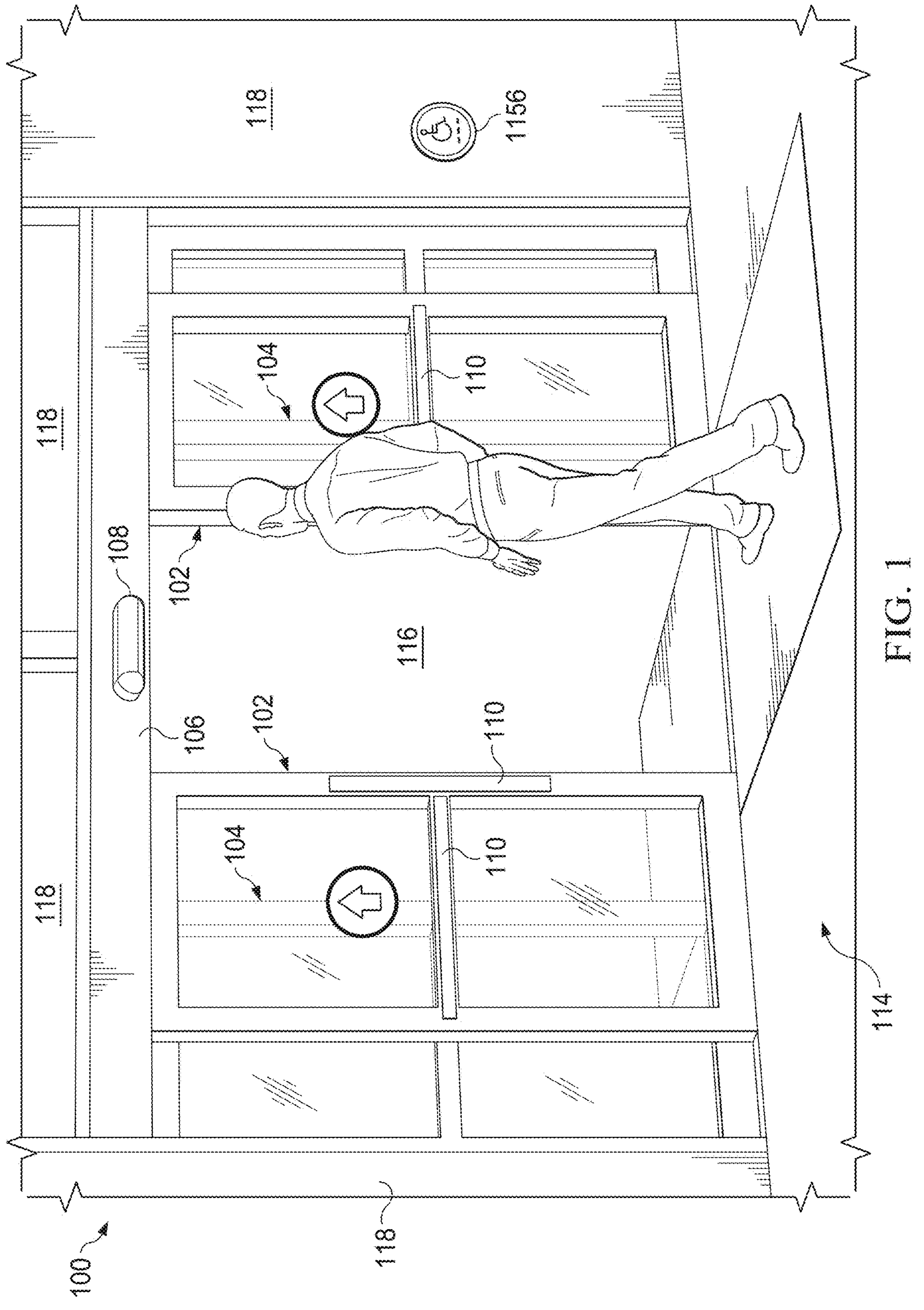
FIG. 1 is a perspective view of a movable barrier system, including an energy harvesting wireless handicap switch, according to examples of the present disclosure.

These Figures will be better understood by reference to the following Detailed Description.

DETAILED DESCRIPTION

For the purpose of promoting an understanding of the principles of the present disclosure, reference will now be made to the examples illustrated in the drawings and specific language will be used to describe them. It will nevertheless be understood that no limitation of the scope of the disclosure is intended. Any alterations and further modifications to the described systems, devices, methods, and any further application of the principles of the present disclosure are fully contemplated as would normally occur to one skilled in the art to which the disclosure relates. In addition, this disclosure describes some elements or features in detail with respect to one or more examples or Figures, when those same elements or features appear in subsequent Figures, without such a high level of detail. It is fully contemplated that the features, components, and/or steps described with respect to one or more examples or Figures may be combined with the features, components, and/or steps described with respect to other examples or Figures of the present disclosure. For simplicity, in some instances the same or similar reference numbers are used throughout the drawings to refer to the same or like parts.

FIG. 1 shows an example movable barrier system 100. The movable barrier system 100 described herein may be referred to as a barrier system, a door system, a garage door system, a gate system, or any other similar term. The movable barrier system 100 includes, among other things, movable barriers 102, fixed barriers 104, a header 106, and a barrier operating system (e.g., barrier operating systems 212, 312 shown in FIGS. 2, 3). Motion sensor(s) 108, remote devices (e.g., the remote device 336 in FIG. 3) and breakout switches 110 may be part of the barrier operating system. In some examples, the breakout switch 110 is a wireless switch coupled to the movable barrier 102 so as to move with the movable barrier 102. Although the breakout switches 110 are shown on the outside of the movable barrier 102 in FIG. 1, the breakout switches 110 may be inside or on top of the movable barriers 102 in some examples, as shown in FIGS. 4A-4C and 5-8. In other examples, the breakout switches 110 may be attached to or disposed within the header 106. In some examples, the wireless breakout switch is an energy harvesting wireless breakout switch. The energy harvesting wireless breakout switch devices, systems, and methods described herein provide many advantages over the prior art. The movable barrier system 100 may also include a handicap switch 1156, which may be an energy harvesting wireless handicap switch.

In the example of FIG. 1, the movable barrier system 100 is a sliding door system. However, the disclosure herein can be applied to any other type of movable barrier system. The movable barriers 102 are movable between open and closed positions, and sometimes, breakout positions. In some examples, when the movable barriers 102 are movable between the open and closed positions, the movable barriers 102 are considered to be in an operating mode. The movable barriers 102 can be moved manually, or automatically by the barrier operating system. The movable barriers 102 allow and restrict movement between spaces 114, 116, the spaces separated by walls 118 and the movable barrier system 100. In some examples, where the space 114 is an interior space and the space 116 is an exterior space, the movable barriers 102 provide egress from the interior space to the exterior space. In some examples, the movable barriers 102 may breakout (e.g., hingedly rotate) from the fixed barriers 104 and the operating mode, thereby increasing the width between the movable barriers 102 and allowing for easier and faster egress. In some examples, the movable barriers 102 break out from other portions of the system, for example, the movable barriers 102 may displace from or relative to the header 106 or other movable barriers 102. In some examples, the movable barriers 102 may be broken out regardless of whether they are in an open position, a closed position, or any position in between. When the movable barriers 102 are in the open or closed positions, or a position slidably in between the movable barriers 102 may be said to be in the operating mode. When the movable barrier 102 is broken out from the slidable positions, the movable barrier 102 may no longer be in a standard operating mode/position and may enter a breakout mode/position. The movable barrier system 100 may be configured such that a mechanical force applied to the movable barrier 102 will break the movable barrier 102 away from its current position and swing open to create a large passageway for persons or objects to enter/exit through.

Figure 6:
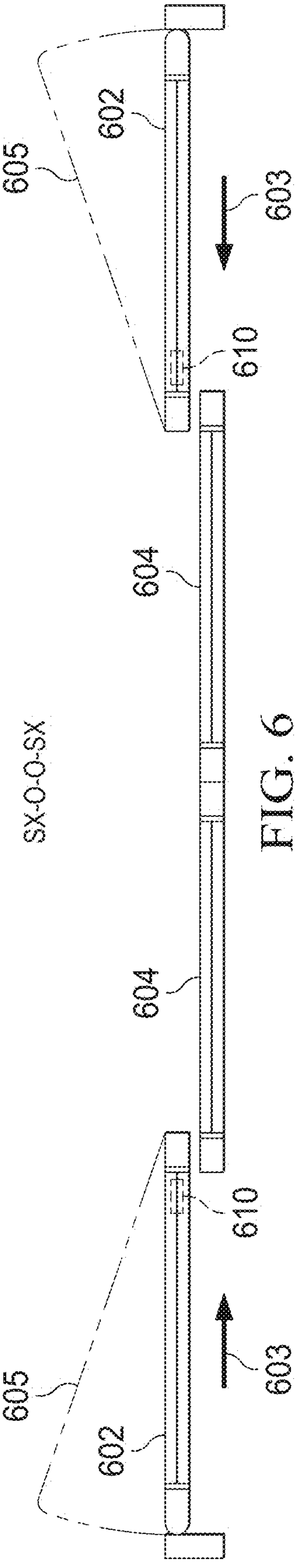
FIG. 6 is a top view of a movable barrier system, according to examples of the present disclosure.
Figure 7:
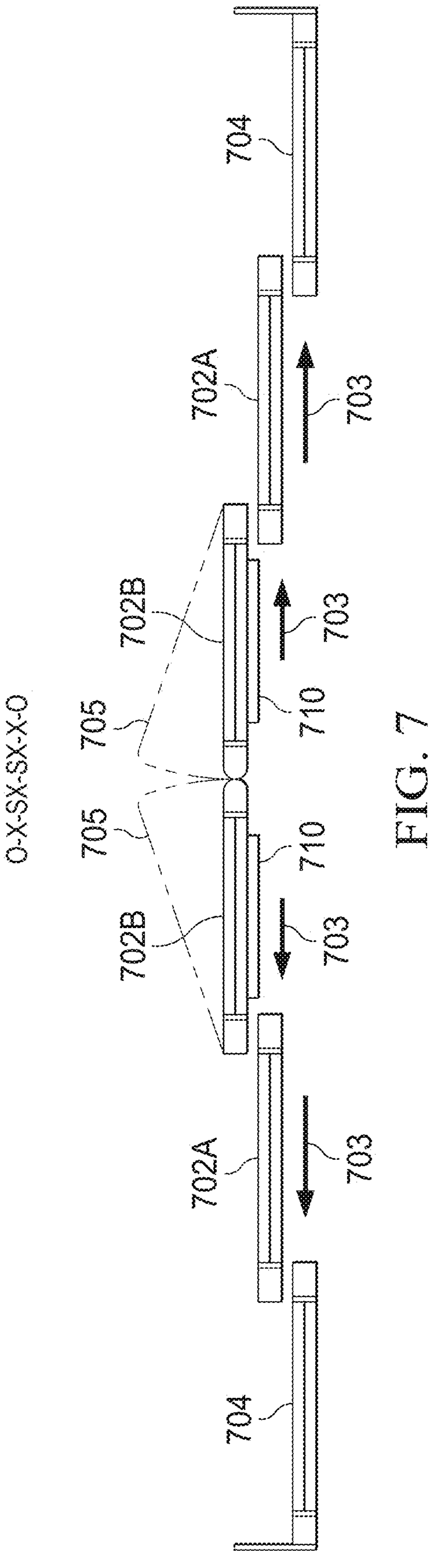
FIG. 7 is a top view of a movable barrier system, according to examples of the present disclosure.
Figure 8:
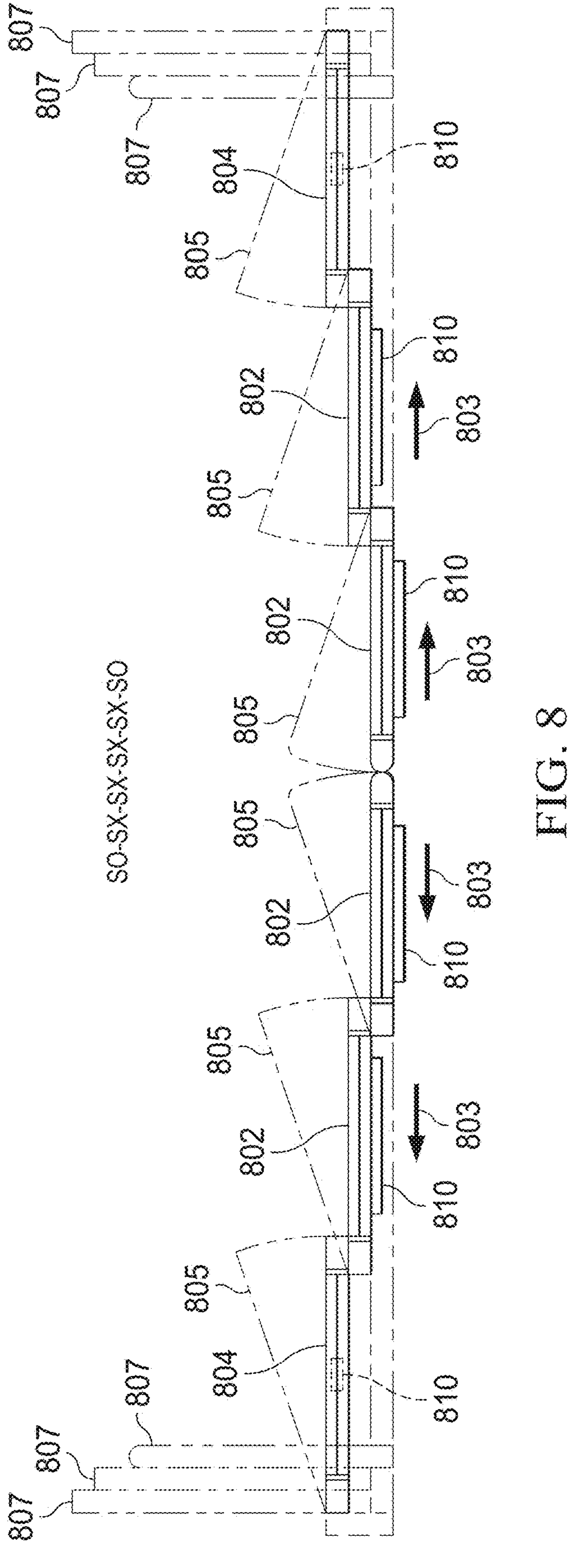
FIG. 8 is a top view of a movable barrier system, according to examples of the present disclosure.

Example breakout positions and breakout capabilities of various sliding door systems are shown in FIGS. 4C-8. Breakout capabilities are important for allowing fast and efficient exit from buildings and other spaces in emergency situations such as medical and fire emergencies, among other emergencies. Even in non-emergency situations, breakout capabilities allow for the transport of large objects such as hospital equipment through doorways. Some barriers can breakout in a single direction, for example, towards either the entry space or the exit space). Some barriers can be broken out in multiple directions, for example, towards both the entry space and the exit space. In some examples, the movable barriers 102 may slide (as shown in FIG. 8) along a drive track (e.g., the drive track 238 shown in FIG. 2) before or after they have been broken out, further increasing the width of the breakout opening. In some examples, the movable barriers 102 may breakout from the fixed barriers 104 and the operating mode in manners other than by rotation. For example, in revolving door systems, the movable barriers may collapse with respect to one another, such that an opening is created between the entry and exit.

Figure 2:
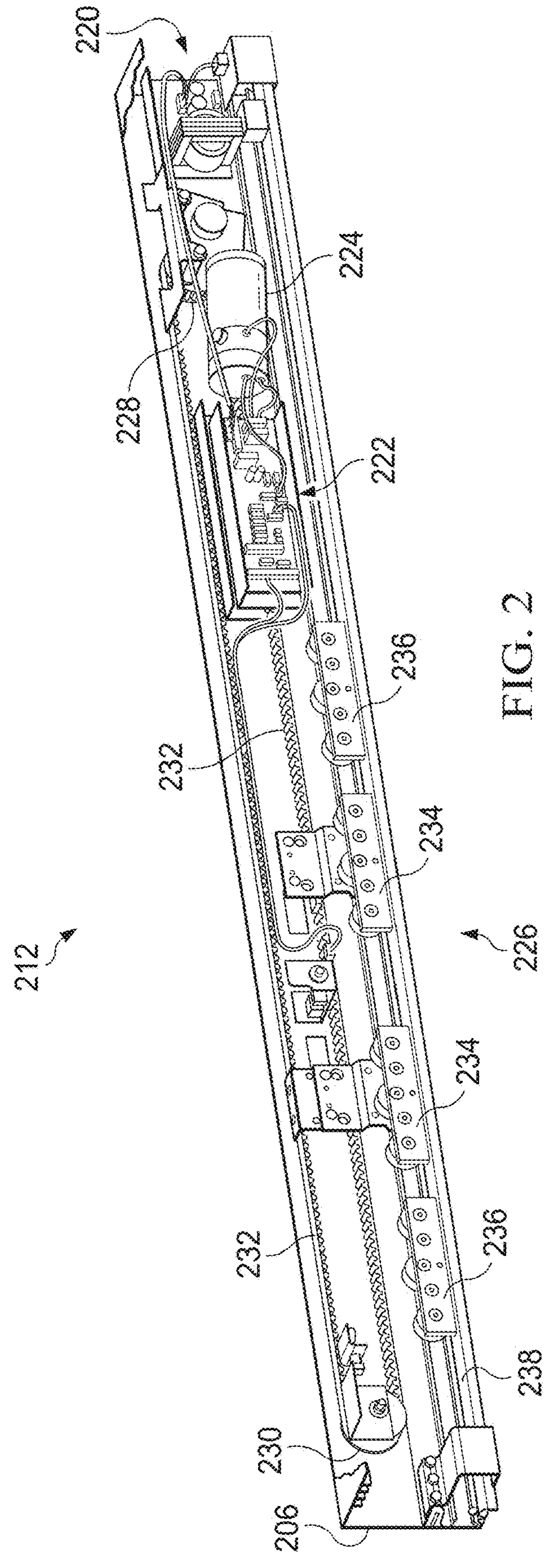
FIG. 2 is a perspective view of portions of a barrier operating system, according to examples of the present disclosure.

FIG. 2 shows portions of a barrier operating system 212 housed within a header 206 (e.g., the header 106). Among other things, the portions of the barrier operating system 212 inside the header 206 include a power supply 220, a controller 222, a motor 224, and a drive system 226. The power supply 220 supplies power to the controller 222. The power supply 220, among other things, may be battery-powered or may be connected to an external power source. The power supply 220 may harvest energy from movement of the movable barriers to supplement the power source. The controller 222 is connected to the motor 224, with the motor 224 being connected to the drive system 226. The controller 222 may control the motor 224 such that the drive system 226 automatically moves the movable barriers 102 between open and closed positions.

The drive system 226 converts rotational motion produced by the motor 224 into the type of motion suitable for operation of the movable barriers 102. In some examples, where the movable barrier system is a sliding door system, the drive system 226 may convert the rotational motion produced by the motor 224 into linear motion. The drive system 226 may include a drive pulley 228, an idler pulley 230, a drive belt 232, drive wheel assemblies 234, and idler wheel assemblies 236, among other components. The drive pulley 228 is connected to the motor 224 and is mated with the drive belt 232. As the motor 224 rotates, the drive pulley 228 converts the rotational motion from the motor 224 into linear motion by turning the drive belt 232. The idler pulley 230 may be positioned at an opposite end of the drive belt 232 from the drive pulley 228. The idler pulley 230 maintains the width and tightness of the drive belt 232, among other things.

Each of the drive wheel assemblies 234 are coupled to the drive belt 232 and one of the movable barriers 102. The drive wheel assemblies 234 may include a plurality of wheels that run along a drive track 238 inside of the header 206. As the drive belt 232 moves linearly, so too do the movable barriers 102. Connecting one of the drive wheel assemblies 234 to an upper portion of the drive belt 232 while connecting another of the drive wheel assemblies 234 to a lower portion of the drive belt 232 moves the movable barriers 102 in opposing directions. After the movable barriers 102 have been moved to create an opening, the direction of rotation of the motor 224 can be reversed, causing movement of the drive belt 232 to reverse, bringing the movable barriers 102 back to a closed position, an initial position, or narrowing the opening. The idler wheel assemblies 236 may not be connected to the drive belt 232 but may be connected to their respective movable barrier 102. The idler wheel assemblies 236 roll along the drive track 238 with the drive wheel assemblies 234, helping to distributing the weight of the movable barriers 102 along a larger length of the header 206.

Figure 3:
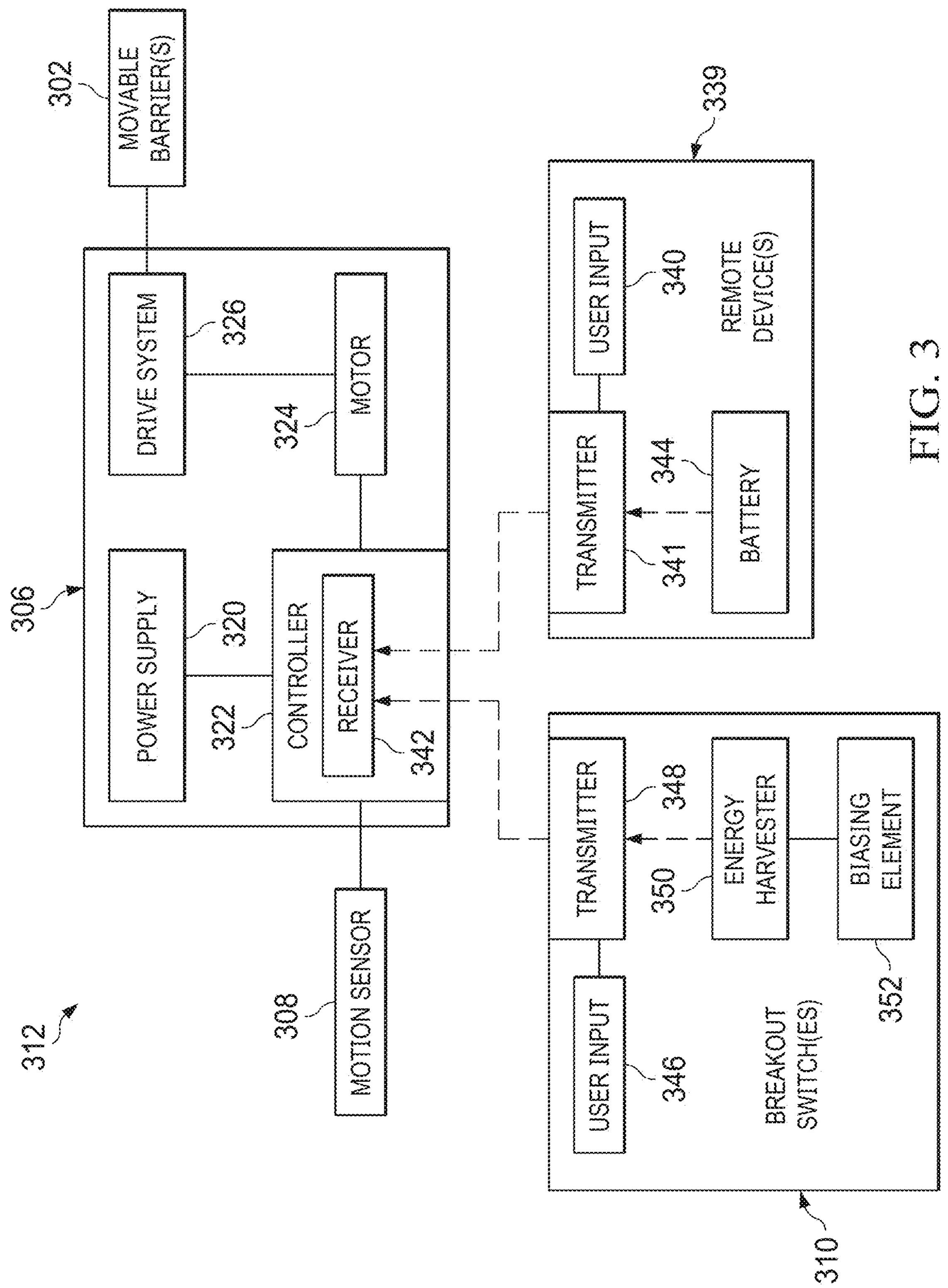
FIG. 3 is a block diagram of a barrier operating system, according to examples of the present disclosure.

FIG. 3 shows a block diagram of a barrier operating system 312. In some examples, the movable barriers 302 (e.g., the movable barriers 102) are moved automatically by the barrier operating system 312. In some examples, the barrier operating system 312 may be referred to as an operator system, a door operating system, a garage door operating system, a gate operating system, an opening system, a door opening system, a garage door opening system, a gate opening system, a control system, or any other similar term.

The header 306 (e.g., the headers 106, 206) may house various components of the barrier operating system 312. The portions of the barrier operating system 312 inside the header 306 may include a power supply 320, a controller 322, a motor 324, and a drive system 326, among other components. The power supply 320 may supply power to the controller 322. The power supply 320 may be battery-powered or may be connected to an external power source, among other things. The power supply 320 may harvest energy from movement of the movable barriers to supplement the power source. In some examples, the controller 322 may be connected to the motor 324, with the motor 324 being connected to the drive system 326. The controller 322 controls the motor 324 such that the drive system automatically moves the movable barriers 302 between open and closed positions.

A motion sensor 308 (e.g., the motion sensor 108) may be positioned on the header 306 or otherwise near the opening created by the door system. The motion sensor 308 senses when a person or object is approaching or obstructing the movable barriers 302. When a person or object comes within a pre-determined distance, 2D area, or 3D area from the motion sensor 308, the motion sensor 308 signals the controller to open the movable barriers 302. The controller may be programmed to close the movable barriers after a predetermined amount of time or when the motion sensor no longer detects a person or object in the sensing area. The motion sensor 308 may be connected to the controller 322 using cables running through the header 306. In some examples, the motion sensor 308 is wireless and may communicate with the controller via Wi-Fi, Bluetooth, radio frequency, infrared, satellite, cellular, microwave, or any other type of wireless communication technology.

One or a plurality of remote devices 339 may be used to control and command various aspects of the barrier operating system 312. For example, a user may actuate or otherwise apply a force to a surface on a user input 340 to initiate opening or closing of the movable barriers 302. The user input 340 may be a button or another type of actuating mechanism. In some examples, the one or more remote devices 339 include a wall-mounted console, a door positioning system ("DPS") mounted on the movable barrier 302, a wall-mounted keypad, a movable remote button, a mobile device, or a computer, among other things. Although the remote devices 339 typically command the barrier operating system 312 to open or close the movable barriers 302, the remote devices 339 can be configured to control the barrier operating system 312 in other ways. For example, the remote devices 339 can prompt the barrier operating system 312 to maintain the movable barriers 302 in a certain position between an opened and closed state. In other examples, the remote device 339 may turn the movable barrier system on or off.

The one or more remote devices 339 may include a wired or wireless transmitter 341 configured to send a signal, via a wired or wireless connection, to a receiver 342 located on the controller 322 circuit board. The transmitter 341 can be powered by a battery 344. However, in some examples, the battery 344 is not needed or may be used only as a supplemental (e.g., secondary) source of power. For example, the remote device 339 may be powered by an energy harvester that harvests energy based on the mechanical force applied to the user input 340 or movement of the remote device 339, among other methods. In this way, the remote device 339 may not need batteries or may need fewer battery replacements. The remote device 339 may employ the same or similar energy harvesting techniques as discussed more fully herein with respect to the breakout switches and the energy harvester 350.

The movable barrier systems disclosed herein include barriers of various styles and functions. Establishing a set of terminology to describe the various types of barriers may be helpful for the purposes of explanation. Generally speaking, panels are the portions of the movable barrier system that slide during normal operation, while sidelites do not slide and are often positioned adjacent the panels. The barriers (e.g., the movable barriers 102 and the fixed barriers 104) may be categorized as either a slide panel ("X"), a slide/swing panel ("SX"), a fixed sidelite ("O"), or a swingout sidelite ("SO"). An X panel is capable of sliding but cannot be broken out into a breakout position; an SX panel is cable of sliding and can be broken out into a breakout position; an O sidelite is not capable of sliding and cannot be broken out into a breakout position; and an SO sidelite is not cable of sliding but can be broken out into a breakout position. In this disclosure, panels and the term movable barrier are sometimes used interchangeably, while the terms sidelite and fixed barrier sometimes used interchangeably. Additionally, it is understood that some movable barrier systems may include pocket areas and swingout pocket panels, as readily understood by one of skill in the art.

Figure 4A:
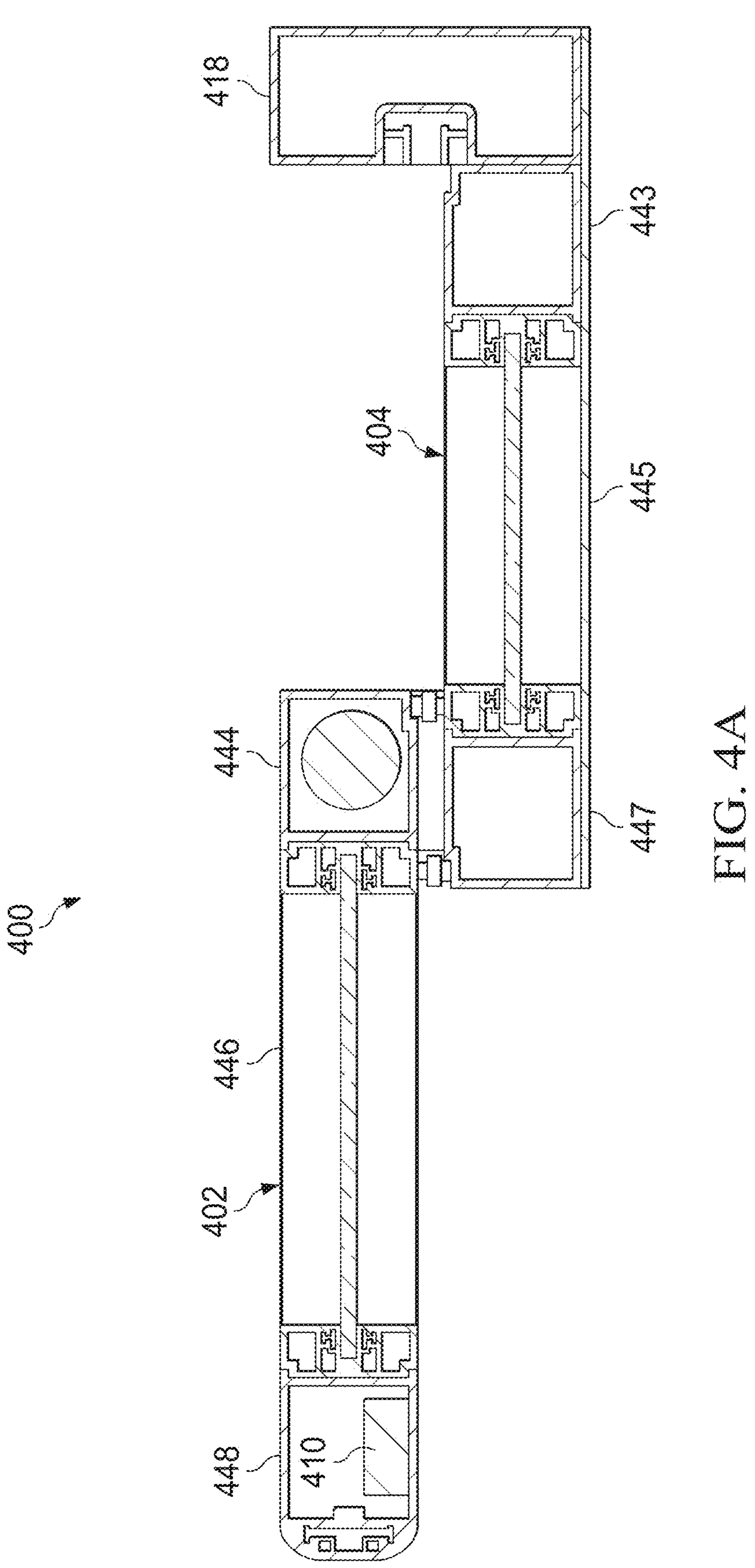
FIG. 4A is a transverse section view of a sliding door system in closed position, according to examples of the present disclosure.
Figure 4B:
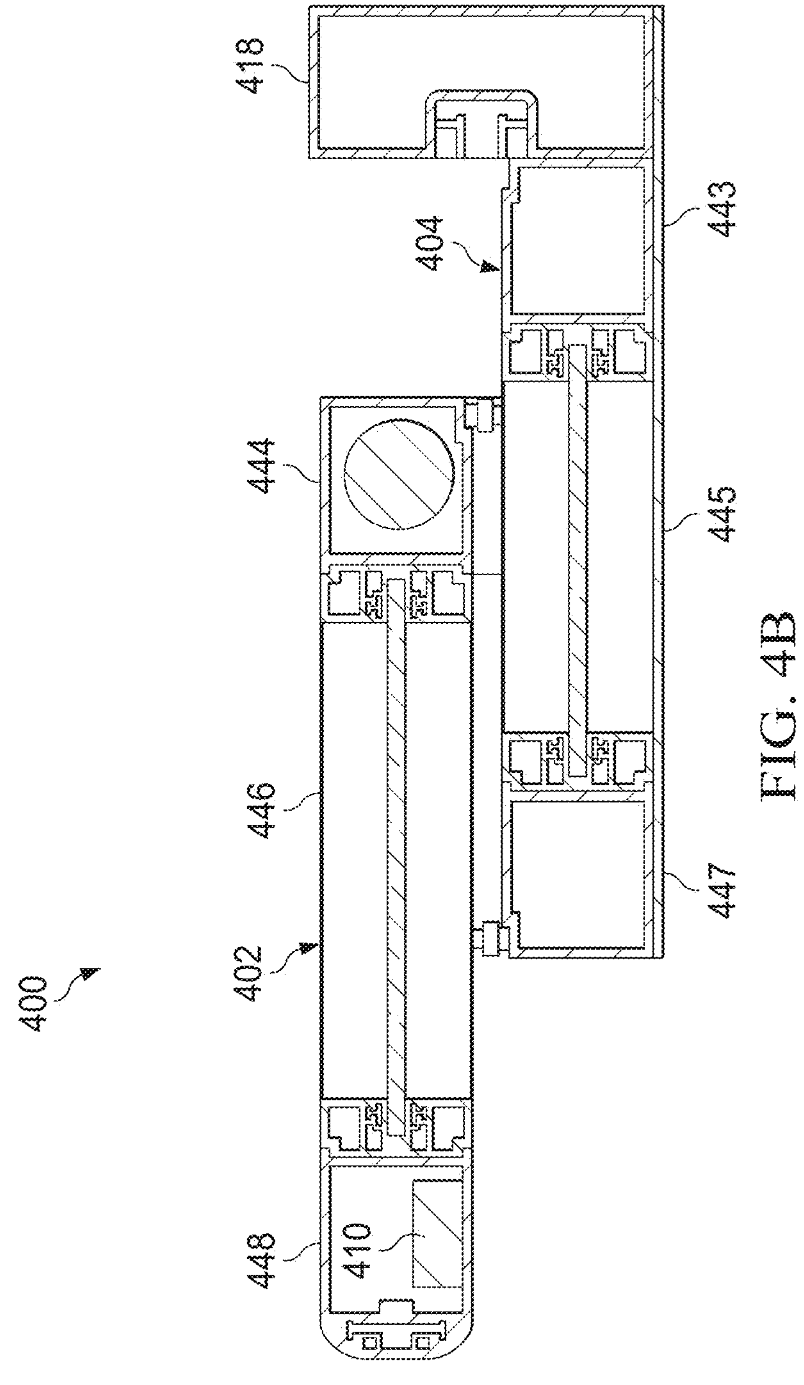
FIG. 4B is a transverse section view of a sliding door system in an open position, according to examples of the present disclosure.
Figure 4C:
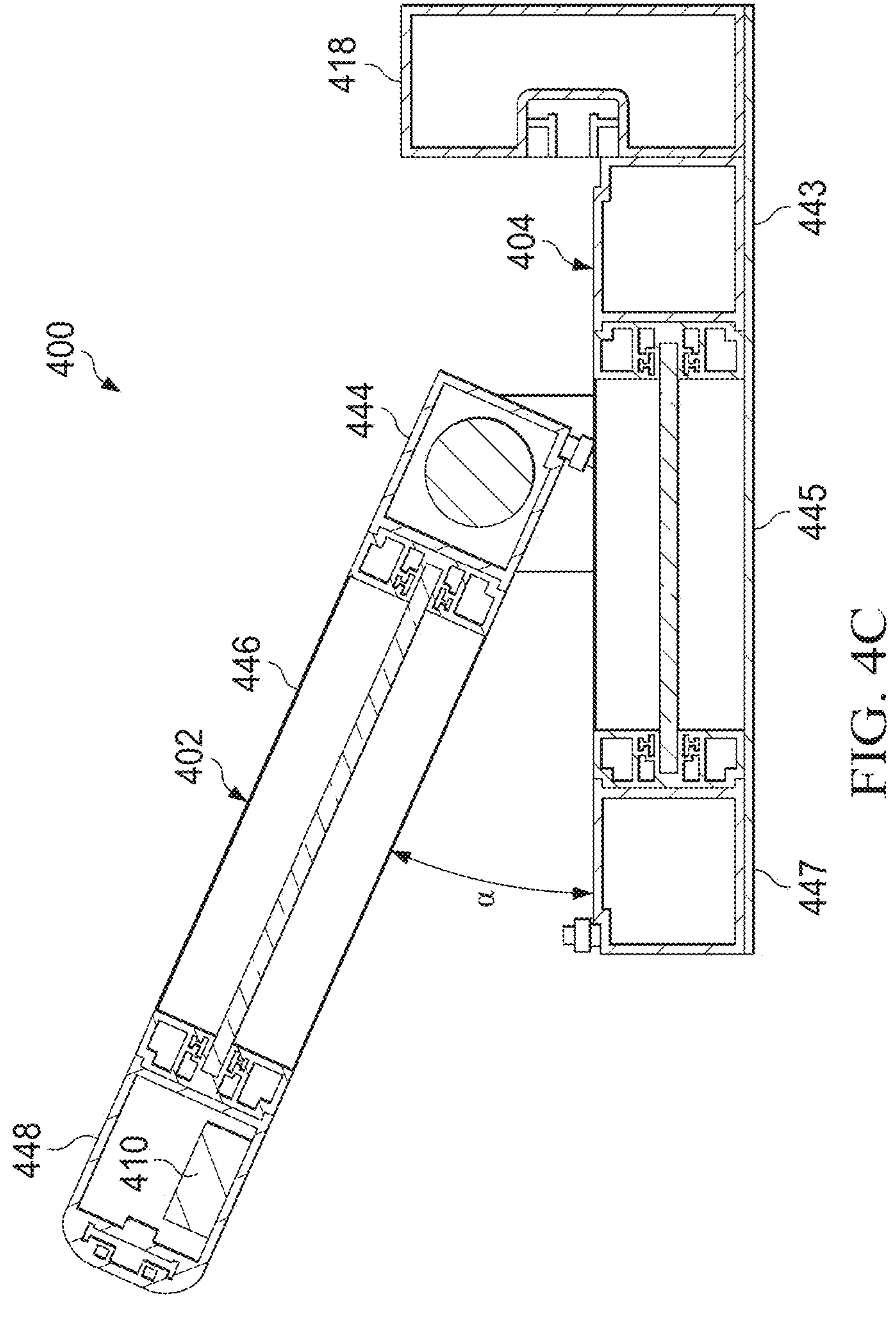
FIG. 4C is a transverse section view of a sliding door system in a breakout position, according to examples of the present disclosure.

FIGS. 4A-4C are transverse section views showing barriers of an example movable barrier system 400 in various positions. The movable barrier systems of this disclosure are not limited to the positions shown in FIGS. 4A-4C and the meaning of "closed position," "open position," and "breakout position" are not limited to the distances, widths, angles, and embodiments illustrated in FIGS. 4A-4C.

The movable barrier system 400 of FIGS. 4A-4C is an SX-O style movable barrier system because it includes a movable barrier 402 which is a slide/swing panel (SX panel) and a fixed barrier 404 which is a fixed sidelite (O sidelite), positioned from left to right. A proximal portion 443 of the fixed barrier 404 is attached to a frame 418 and the movable barrier 402 is slidably and rotatably connected to the fixed barrier 404. In some examples, the movable barrier system 400 may be an SX-SO style, X-O style, or X-OX style system, including the system styles shown and described with respect to FIGS. 5-8.

FIG. 4A shows the movable barrier system 400 in a closed position. The movable barrier 402 may extend distally of the fixed barrier 404 to enclose a space. In this example of the closed position, a proximal portion 444 of the movable barrier 402 overlaps a distal portion 447 of the fixed barrier 404. A central portion 446 and a distal portion 448 of the movable barrier 402 extends beyond the distal portion 447 of the fixed barrier 404, thereby closing an opening of a passageway distal of the fixed barrier 404. In some examples of the closed position, only a part of the central portion 446 extends beyond the distal portion 447 of the fixed barrier 404, while in other examples, there is no overlap between the proximal portion 444 and the distal portion 447. In the closed position, the distal portion 448 may mate with or abut another sliding door or a wall, thereby impeding all movement through the opening.

FIG. 4B shows the movable barrier system 400 in an open or partially opened position. In the open position, a proximal portion 444 of the movable barrier 402 overlaps either the central portion 445 or the proximal portion 443 of the fixed barrier 404. Unlike in the closed position, only part or none of the movable barrier 402 is extended distally beyond the fixed barrier 404, thereby creating an opening/passageway positioned distal of the fixed barrier 404 and the movable barrier 402. For example, only a part of the central portion 446 may extend beyond the distal portion 447 of the fixed barrier 404. In some examples, neither the distal portion 448 nor the central portion 446 extend beyond the fixed barrier 404, thereby increasing the width of the opening. In the open position, the distal portion 448 is not mated with or abutted against another sliding door or wall, thereby allowing persons and object to pass through the opening.

FIG. 4C shows the movable barrier 402 in a breakout position. In the breakout position, the movable barrier 402 has broken away from the fixed barrier 404 and the operating mode, allowing for more people and/or objects to pass through the opening in a smaller amount of time. The movable barrier 402 may enter the breakout position at any time during the process of opening and closing the movable barrier system 400. In this way, the movable barrier system 400 need not be in a fully open position before it is broken out. Similarly, the movable barrier system 400 need not be in a fully closed position before it is broken out. To enter the breakout position, the movable barrier 402, which is connected to the components of a header (e.g., the header 206), is rotated away from the fixed barrier 404, thereby increasing the width and depth of the passageway between the entry and exit.

The angles to which the movable barrier 402 may break out from the fixed barrier 404 and the operating mode depend on the movable barrier system. For example, some movable barriers 402 may be capable of full breakout, meaning that the movable barrier 402 is capable of rotating 90 degrees or greater with respect to fixed barrier 404. Some movable barriers 402 are only configured for partial breakout, meaning that the movable barrier 402 is only capable of rotating less than 90 degrees with respect to the fixed barrier 404. For example, FIG. 4C shows the movable barrier in a partial breakout position, where the movable barrier 402 has broken out at an angle $\alpha$ (alpha) of approximately 30 degrees from the fixed barrier 404. Whether the movable barrier 402 is configured for full or partial breakout may be dependent on building capacity or other variables surrounding the safe and efficient exit of the building in all scenarios.

The movable barrier 402 may break out from the fixed barrier 404 and the operating mode in a variety of different ways. In some examples, a mechanical force applied to the movable barrier 402 will cause the movable barrier 402 to breakout from the operating mode and away from the fixed barrier 404. In some examples, applying a force to a breakout switch 410 (e.g., the breakout switches 110, 310) will release a connection between the movable barrier 402 and the fixed barrier 404, allowing breakout. In some examples, pressing the breakout switch (e.g., 110, 410) will cause the breakout switch 410 to signal the barrier operating system (e.g., the barrier operating systems 212, 312) to automatically breakout the movable barrier 402. If the system includes multiple barriers, breakout of one barrier may cause breakout of other barriers. In yet other examples, the movable barrier 402 can be broken out by sending a control signal from a remote device (e.g., the remote device 339).

In some examples, the slide/swing panel movable barrier 402 can be slid manually in one direction or another while in the breakout position. For example, a user may push the slide/swing panel movable barrier 402 in FIG. 4C proximally towards the frame 418. This feature is illustrated in FIG. 8 and allows for the maximum amount of egress through the breakout opening.

Conventionally, the nature of sliding door systems has made the integration of wired connections and certain types of switches difficult. For example, placing a wired switch on a movable barrier presents certain issues. The wires may be damaged by the door system, may be exposed to environmental elements, or may be tampered with. Particularly, the movement of a sliding panel makes coupling a wired switch the sliding panel challenging. Furthermore, battery-powered switches need frequent replacement batteries and cannot be relied upon for constant uptime, which is critical in times of emergency for breakout doors.

The use of an energy harvesting wireless breakout switch as described herein, allows for placement of the breakout switch on a movable or fixed barrier without the use of wires or without the need for frequent battery replacements, among other advantages. For example, turning back to FIG. 3, one or a plurality of breakout switches 310 (e.g., the breakout switches 110, 310) may be included in the barrier operating system 212. The breakout switch 310 may be coupled to the movable barrier 402 (e.g., the movable barrier 102), the fixed barrier 401 (e.g., the fixed barrier 104), or the operating system (e.g., the operating system 212). In some examples, the breakout switch 310 is wirelessly mounted to a surface or wall of the movable barrier 402. In other examples, the breakout switch 310 is wirelessly integrated into the surface or wall of the movable barrier 402. The breakout switch 310 may be coupled to a horizontal wall of the barrier, a vertical wall of the barrier, both, or any other part of the movable barrier system.

When the breakout switch 310 is accessible to users, unlike the example shown in FIGS. 4A-4C where the breakout switch 410 was located inside of the door system, the breakout switch 310 may include a user input 346 having an input surface configured to receive a mechanical force applied to breakout the movable barrier 402. The input surface may have a large surface area, making the breakout switch 310 readily visible to all. In some examples, the input surface may be positioned on movable barrier 402 at a height which is easily accessible by all. Furthermore, the input surface may be location on a portion of the movable barrier 402 that is likely to be pushed by a user in the event of an emergency, even if the user is unaware that they are pushing on the breakout switch 310.

The breakout switch 310 may be used for a variety of functions. In some examples, upon actuation of the user input 340, the breakout switch 310 may cause the movable barriers 402 to immediately stop moving. By stopping movement of the drive system 326, the movable barriers 402 are prevented from opening or closing on objects within their path, reducing the risk of injuries, property damage, and damage to the movable barrier system 300. Furthermore, by stopping movement, the passageway for egress remains large, allowing for quick entry/exit. In some examples, the breakout switch 310 itself may cause the doors to breakout. Pressing the breakout switch 310 can release a bolt or other mechanism that prevents rotation of the movable barriers 402. When the bolt or other mechanism is released, the movable barriers 402 can be rotated to their breakout position.

The one or more breakout switches 310 may include a transmitter 348 configured to send a signal to the receiver 342 located on the controller 322 circuit board. The transmitter 348 can send the signal wirelessly, for example, using Wi-Fi, Bluetooth, radio frequency, infrared, satellite, cellular, microwave, or any other type of wireless communication technology. The signal may indicate that the movable barrier 402 has been broken out from the fixed barrier 404. In some examples, the signal may prompt the barrier operating system 312 to breakout the movable barrier 402. If the signal indicates that the movable barrier 402 has broken out from the fixed barrier 404, the controller 322 may be configured to change, in response to the signal, movement of the movable barrier 402 between the open and closed positions.

Depending on the particular type of door system or the application, changing movement of the movable barrier 402 could include a variety of changes. For example, changing movement of the movable barrier may include starting the movement, halting movement of the movable barrier, slowing the movement, speeding up the movement, decelerating the movement, accelerating the movement, reversing the movement, or pausing the movement.

The transmitter 348 of the breakout switch 310 can be powered by an energy harvester 350. That is, the energy harvester 350 is configured to generate enough power so that the breakout switch 310 can transmit a signal to the controller 322 without using an alternative or supplemental power source.

For example, the energy harvester 350 is configured to convert energy supplied to the movable barriers 302 or the breakout switch 310 to a form of electrical energy needed to transmit signals to the controller 322. In some examples, the energy harvester 350 may convert a mechanical force applied to the input surface of the user input 346 into electrical energy. In other examples, the energy harvester 350 may convert the movement of the breakout switch 310 caused by the sliding or breakout movements of the movable barrier 302 into electrical energy.

In other examples, even when the mechanical force is not applied directly to the breakout switch 310 but is applied more generally to the movable barrier 302, the breakout switch 310 can convert the breakout movement of the movable barrier 302 into electrical energy. The breakout switch 310 can use stored potential energy to generate kinetic energy or may generate kinetic energy based on movement. The energy harvester 350 captures the kinetic energy and uses it as a power source to transmit a signal. The breakout switch 310 may be coupled between and/or rollable between the movable barrier 302 and the barrier operating system or between the movable barrier 302 and the fixed barrier 304.

This process may be facilitated using a biasing element 352. The biasing element 352 may be compressed in the standard operating mode to store potential energy so that when the movable barrier 302 breaks out from the operating mode, the biasing element generates kinetic energy. For example, the biasing element 352 may be coupled to the movable barrier 302 and compressed by the header or another component of the barrier operating system such that decompression occurs when the movable barrier 302 is no longer positioned under the header of the barrier operating system. In other examples, the biasing element 352 is positioned on the barrier operating system and is decompressed when the movable barrier 302 is no longer in a position to keep the biasing element 352 under compressive forces.

Alternatively, the biasing element 352 may be in an extended or uncompressed state when the system is in the barrier operating mode such that the biasing element is compressed or otherwise deformed when a breakout movement occurs, thereby generating kinetic energy to be harvested by the energy harvester 350. It is understood that the biasing element 352 may be part of the breakout switch 310 or may be coupled to the breakout switch 310. The biasing element 352 may my disposed on any of the movable barrier 302, a fixed barrier, or the barrier operating system. Many different forms of biasing elements 352 are contemplated. For example, the biasing element could be a spring, a lever, compressed air, an elastomer, a hydraulic system, a flywheel, a magnet, a capacitor, or a gas spring, among other examples. In some examples, the Based on the above, it is shown that the energy harvester 350 may be the lone source of power for the breakout switch 310. This allows the breakout switch 310 to operate wirelessly and without the use of batteries. In other examples, the energy harvester is a supplemental (e.g., secondary) source of power, minimizing the frequency of battery replacements.

In some examples, the signal sent from the breakout switch 310 to the controller 322 is transmitted before or at the same time as the energy harvested by the energy harvester 350 reaches a threshold amount. The energy harvested by the energy harvester 350 may correspond to or otherwise be a ratio of the energy applied to the movable barrier 402. The harvested energy may reach the threshold amount before or at the same time as the mechanical force applied to the breakout switch is large enough to cause the movable barrier 402 to breakout from the fixed barrier 404 and their operating mode. For example, if 45 pounds of force over a certain distance or at a certain velocity is needed to breakout the movable barrier 402, the breakout switch 310 may be programmed such that the threshold amount is set to the amount of energy harvested before or at the same time as the power/force required for breakout is applied to the movable barrier 402. In this way, the signal from the breakout switch 310 to the controller 322 may be transmitted slightly before or immediately upon breakout of the movable barrier 402 but will not be transmitted if the mechanical force applied to the movable barrier 402 is well below the force required to breakout the movable barrier 402.

Figure 5:
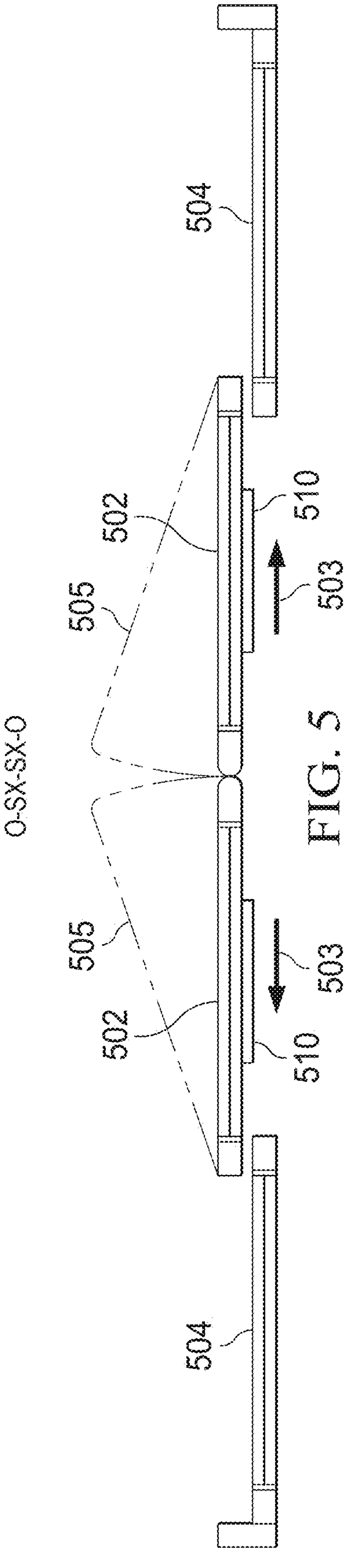
FIG. 5 is a top view of a movable barrier system, according to examples of the present disclosure.

FIG. 5 shows an O-SX-SX-O style movable barrier system 500. The movable barrier system 500 includes fixed barriers 504 that are fixed sidelites (O sidelites) and movable barriers 502 that are slide/swing panels (SX panels). The slide paths 503 show directionals that the movable barriers 502 may slide to form an opening. The swing paths 505 show direction paths that the movable barriers 502 may swing to breakout from the fixed barriers 504 and from their original sliding position operating modes. The slide paths and swing paths illustrated herein are only for illustrational purposes and are not limiting. For example, the slide paths show horizontal motion, but some movable barrier systems are capable of vertical motion as well. Additionally, the swing paths show partial breakout positions, but the movable barrier systems are capable of full breakout in some examples, as previously discussed.

The movable barrier system 500 includes breakout switches 510. Because the fixed barriers 504 are fixed sidelites, it may be advantageous to include the breakout switches 510 on the movable barriers 502, which are slide/swing panels. To manually breakout the movable barrier system 500, a person would be required to apply a mechanical force to the movable barriers 502, rather than the fixed barriers 504. Accordingly, placing the breakout switch 510 on the movable barriers 502 would enable the person to breakout the movable barriers 502 and stop the automated functions and movement of the movable barrier system 500 simultaneously. Further, if the breakout switch is placed on the movable barrier 502, the breakout switch 510 can utilize the movement of the movable barrier 502 to generate the energy required to send the signal to the barrier operating system.

Because the breakout switch 510 is an energy harvesting wireless switch (not a wired switch), use of the breakout switch 510 on the movable barrier 502 becomes possible. Because the breakout switches 510 are wireless, their installation and replacement costs are decreased. Furthermore, the time it takes to install and replace the breakout switches 510 is decreased. Additionally, due to the nature of the energy harvesting wireless breakout switches described herein, the breakout switches 510 are usable without requiring rolling engagement with the fixed barrier 504. Because the breakout switches 510 are not in constant contact with the fixed barriers 504, the breakout switches 510 do not leave physical markings on the fixed barriers 504 and do not wear out quickly. Additionally, the breakout switches 510 can be placed on any part or portion of the movable barriers 502. In this regard, the breakout switches 510 can be placed on any other portion of the movable barriers 502 than is shown.

In some examples, the movable barrier system 500 may be configured such that large portions of or the entire movable barrier 502 may function as a breakout switch 510. In such an example, a person need worry about locating the breakout switch before applying a force to movable barrier 502 to breakout. In some examples, a frame member or frame of the movable barrier 502 may function as the breakout switch. In yet other examples, a window or glass pane of the movable barrier 502 may function as a breakout switch.

FIG. 6 shows an SX-O-O-SX style movable barrier system 600. In some examples, the movable barrier system 600 may be similar to the movable barrier system 500, except as described. For example, the movable barrier system 600 includes movable barriers 602 that are slide/swing panels (SX panels) and fixed barriers 604 that are fixed sidelites (O sidelites). The orientation/order of the barriers from left to right in FIG. 6 is different from that of the barriers in FIG. 5. As such, the movable barrier system 600 is capable of creating two separate openings. The slide paths 603 show directionals that the movable barriers 602 may slide to form an opening. The swing paths 605 show directionals that the movable barriers 602 may swing to breakout from the fixed barriers 604 and from their original operating mode sliding positions.

Breakout switches 610 are shown positioned on the movable barriers 602. Because movable barrier system 600 creates two openings, the breakout switches 610 are separated at least by the fixed barriers 604. In some examples, the movable barrier system 600 is configured such that activation of one breakout switch 610 results in simultaneous activation of the other breakout switch 610. Accordingly, activation of only one of the breakout switches 610 may result in one outcome for the whole movable barrier system 600. For example, applying a mechanical force to one of the breakout switches 610 may cause the barrier operating system to stop the automated functionalities for all of the barriers in the system.

FIG. 7 shows an O-X-SX-SX-X-O style movable barrier system 700. In some examples, the movable barrier system 700 may be similar to the movable barrier systems 500, 600, except as described. The movable barrier system 700 includes fixed barriers 704 that are fixed sidelites (O sidelites), movable barriers 702A that are slide panels (X panels), and movable barriers 702B that are slide/swing panels (SX panels). The orientation/order of the barriers from left to right in FIG. 7 is different from that of the barriers in FIG. 5 in that the movable barrier system 700 includes slide panels positioned between the fixed sidelites and the slide/swing panels. The slide paths 703 show directionals that the movable barriers 702A, 702B may slide to form an opening. The swing paths 705 show directionals that the movable barriers 702B may swing to breakout from the movable barriers 702A and from their original operating mode sliding positions.

Breakout switches 710 are shown positioned on the slide/swing panel movable barriers 702B. Unlike in the movable barrier system 500, 600, which show movable barriers breaking out from fixed barriers, the movable barriers 702B are capable of breaking out from movable barriers. In that regard, the movable barriers 702B can breakout from the slide panel movable barriers 702A. As previously discussed, installing a wired switch on a movable barrier is particularly difficult. The shortcomings of using a wired switch on a movable barrier slidably coupled to another movable barrier may be even more drastic. However, because the breakout switches 710 may be energy harvesting wireless breakout switches, they can be placed on a movable barrier that is slidably coupled to another movable barrier. In this way, the breakout switches herein are usable on a much larger range of movable barrier systems than wired or rolling-engagement type of switches.

FIG. 8 shows an SO-SX-SX-SX-SX-SO style movable barrier system 800. In some examples, the movable barrier system 800 may be similar to the movable barrier systems 500, 600, 700, except as described. The movable barrier system 800 includes movable barriers 802 that are slide/swing panels (SX panels) and fixed barriers 804 that are swingout sidelites (SO sidelites). The slide paths 803 show directionals that the movable barriers 802 may slide to form an opening. The swing paths 805 show directionals that the movable barriers 802 and fixed barriers 804 may swing to breakout from their original operating mode sliding and operating mode fixed positions. In this example, all of the barriers are capable of breaking out. Additionally, the movable barriers 802 and the fixed barriers 804 are shown having additional breakout capabilities beyond rotational breakout. For examples, the barriers 802, 804 are capable of horizontal/slidable breakout. In this way, the barriers 802, 804 may slide along a drive track (e.g., the drive track 238) after or before they have been rotationally broken out, further increasing the width of the breakout opening. This is illustrated by the breakout positions 807 showing the barriers if they have been both rotationally and slidably broken out. After both rotational and slidable breakout, the movable barrier system 800 is capable of fast egress, as the breakout width is as large as possible for the system.

Breakout switches 810 are shown positioned on all four of the movable barriers 802 as well as on the two fixed barriers 804. In this way, the breakout switches herein are not only usable on movable barriers, but also on fixed barriers. In some examples, if one of the breakout switches 810 is activated, it may cause all of the other breakout switches 810 to send signals to the barrier operating system, changing movement of the respective barriers paired to that breakout switch 810. In other examples, where breakout of the movable barriers is particularly common, for example, in certain hospital settings where large equipment is passed through the openings, the barrier operating system may be programmed such that activation of one of the breakout switches 810 triggers activation of only some or none of the other breakout switches 810.

The technologies and advancements described above and below allow the methods shown in FIGS. 9 and 10 to be performed. While FIGS. 9 and 10 illustrates operations according to one example, other examples may omit, add to, reorder and/or modify any of the operations shown in FIGS. 9 and 10.

Figure 9:
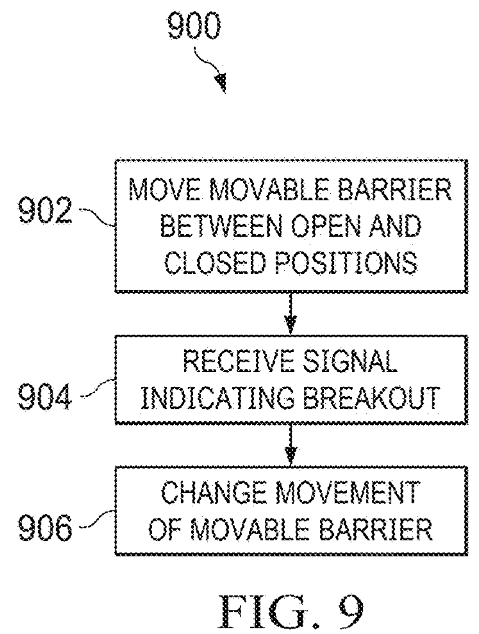
FIG. 9 is a flowchart illustrating a method for controlling a movable barrier, according to examples of the present disclosure.
Figure 10:
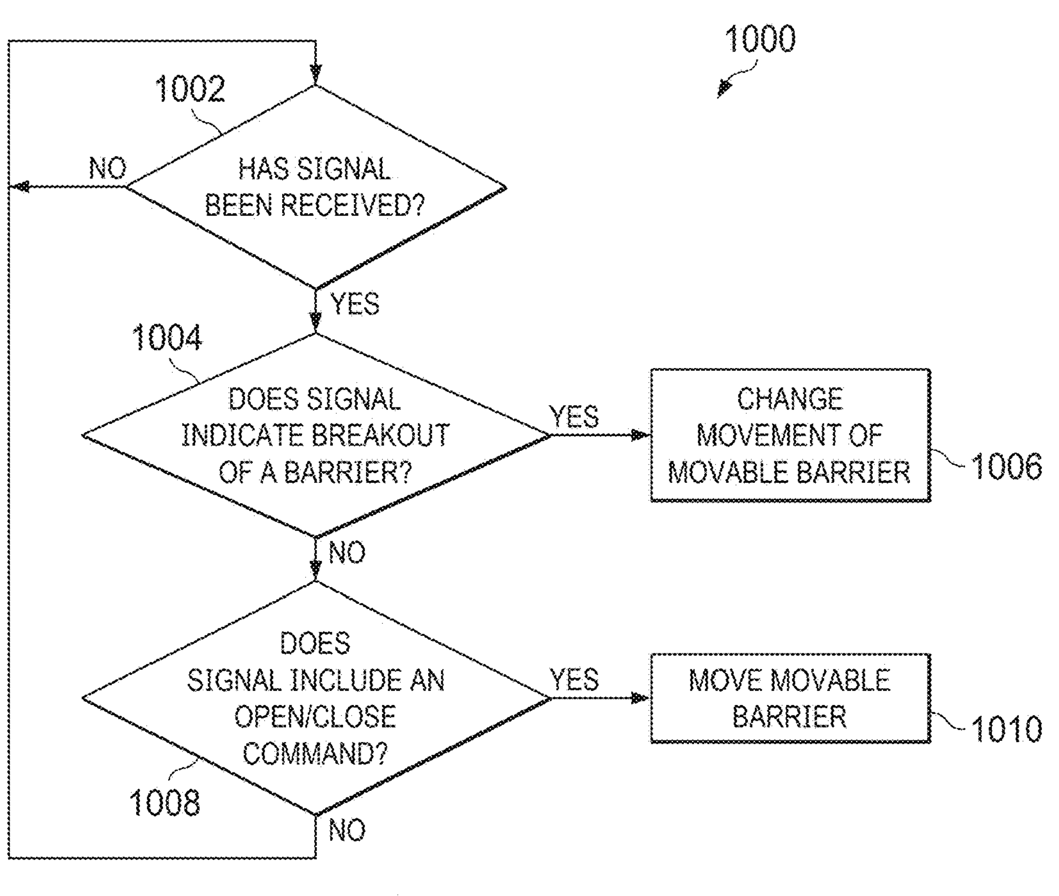
FIG. 10 is a flowchart illustrating a method for operating a movable barrier, according to examples of the present disclosure.

FIG. 9 shows an example method 900 for controlling a movable barrier using a barrier operating system including a breakout switch.

Operation 902, in some examples, includes moving a movable barrier (e.g., the movable barriers 102, 302, 402) between open and closed positions using a barrier operating system (e.g., the barrier operating systems 212, 312). The movable barrier may be configured to breakout from an operating mode, a fixed barrier (e.g., the fixed barriers 104), and/or a movable barrier (e.g., the movable barrier 702A or movable barrier 802). The barrier operating system may include a breakout switch (e.g., the breakout switches 110, 310) disposed on the movable barrier and a controller (e.g., the controllers 222, 322). In some examples, the breakout switch is powered by an energy harvester (e.g., the energy harvester 350). Energy may be harvested with the energy harvester from kinetic energy generated by a biasing element during breakout of the movable barrier from the operating mode, from operating (e.g., sliding or swinging) movement of the movable barrier, and/or from a mechanical force applied to an input surface of the breakout switch.

In some examples, a biasing element may be held in a compressed or uncompressed state so that breakout from the operating mode generates kinetic energy. In some examples, there is no biasing element, but the switch may be triggered by displacement of one switch component relative to another component. In this way, the breakout switch is capable of using harvested energy to generate and send signals to a barrier operator without the need for batteries or wires. The mechanical force may cause the movable barrier to breakout from the fixed barrier. In some examples, the mechanical force is intended to change sideways or lateral sliding movement of the movable barrier. In other examples, the user may only intend to breakout the movable barrier by applying the mechanical force and may not understand that the mechanical force on the breakout switch will also send a signal to the controller to change sideways or lateral sliding movement of the movable barrier.

Operation 904, in some examples, includes receiving a signal at the controller from the breakout switch disposed on the movable barrier indicating that the movable barrier has broken out from the fixed barrier. The signal may be wirelessly transmitted to the controller with the breakout switch. Similarly, the breakout switch may be wirelessly mounted to a wall of the movable barrier or on or insider the header on a portion of the barrier operating system. In this way, the breakout switch is capable of use on a movable barrier without the need for wires or batteries. The signal may be transmitted to the controller before or at the same time as the harvested energy reaches a threshold amount of energy. For example, the harvested energy may reach the threshold amount before or at the same time as the mechanical force applied to the breakout switch is large enough to cause the movable barrier to breakout from the fixed barrier.

That is, the threshold amount is set to send the signal to the controller before or at the same time that the barrier breaks-out of its aligned lateral path.

Operation 906, in some examples, includes changing, in response to the signal, movement of the movable barrier between the open and closed positions. Depending on the particular type of door system or the application, changing movement of the movable barrier could include a variety of changes. For example, changing movement of the movable barrier may include starting the movement, halting movement of the movable barrier, slowing the movement, speeding up the movement, decelerating the movement, accelerating the movement, reversing the movement, or pausing the movement. Changing movement still allows the barrier to swing to a position clearing the passageway.

When the movement is halted, the movable barriers are prevented from opening or closing on objects within their path, reducing the risk of injuries, property damage, and damage to the movable barrier system 300. Furthermore, by stopping movement, the passageway for egress remains large, allowing for quick entry/exit. When movement is accelerated, the movable barriers may be accelerated into an open position to allow for faster exit and wider breakout openings.

FIG. 10 shows an example method 1000 for controlling a movable barrier using a barrier operating system including a breakout switch.

Operation 1002, in some examples, includes listening for a signal and determining, using a barrier operating system, whether a signal has been received. The barrier operating system may receive the signal wirelessly from an energy harvesting wireless breakout switch as described herein. A processor on a controller of the barrier operating system may make such a determination. If a signal has not been received, operation 1002 repeats and the barrier operating system continues to search for and receive signals. If a signal has been received, the method continues to operation 1004, where the barrier operating system determines whether the signal indicates that a barrier has been broken out. If the signal does indicate a breakout of a barrier, then the method proceeds to operation 1006, where the barrier operating system changes movement of the barrier between open and closed positions, while permitting the barrier to swing open. By changing movement of the barrier during a breakout situation, egress can occur safely and efficiently. If the signal does not indicate that a breakout of a barrier has occurred, then the method proceeds to operation 1008. At operation 1008, the barrier operating system determines whether the signal includes and open or a close command. If the signal includes an open or a closed command, the method proceeds to operation 1010, where the barrier operating system moves the movable barrier in the appropriate direction to an open or a closed position. If the signal does not include an open or a close command, the method loops back to operation 1002, and the barrier operating system continues to determine whether a signal has been received and whether the signal is from a breakout switch such as an energy harvesting wireless breakout switch that indicates a breakout.

FIGS. 11-14 show energy harvesting wireless handicap switch devices, systems, and methods. The handicap switches may include the same or similar features as the breakout switches and remote devices described above. Similarly, the breakout switches and remote devices described above may include the same or similar features as the handicap switches described below. In some examples, the handicap switches are similar to the breakout switches and remote devices, except as described. The breakout switches, handicap switches, and remote devices may be included in any of the movable barrier systems and on any of the movable barrier types described herein.

Figure 11:
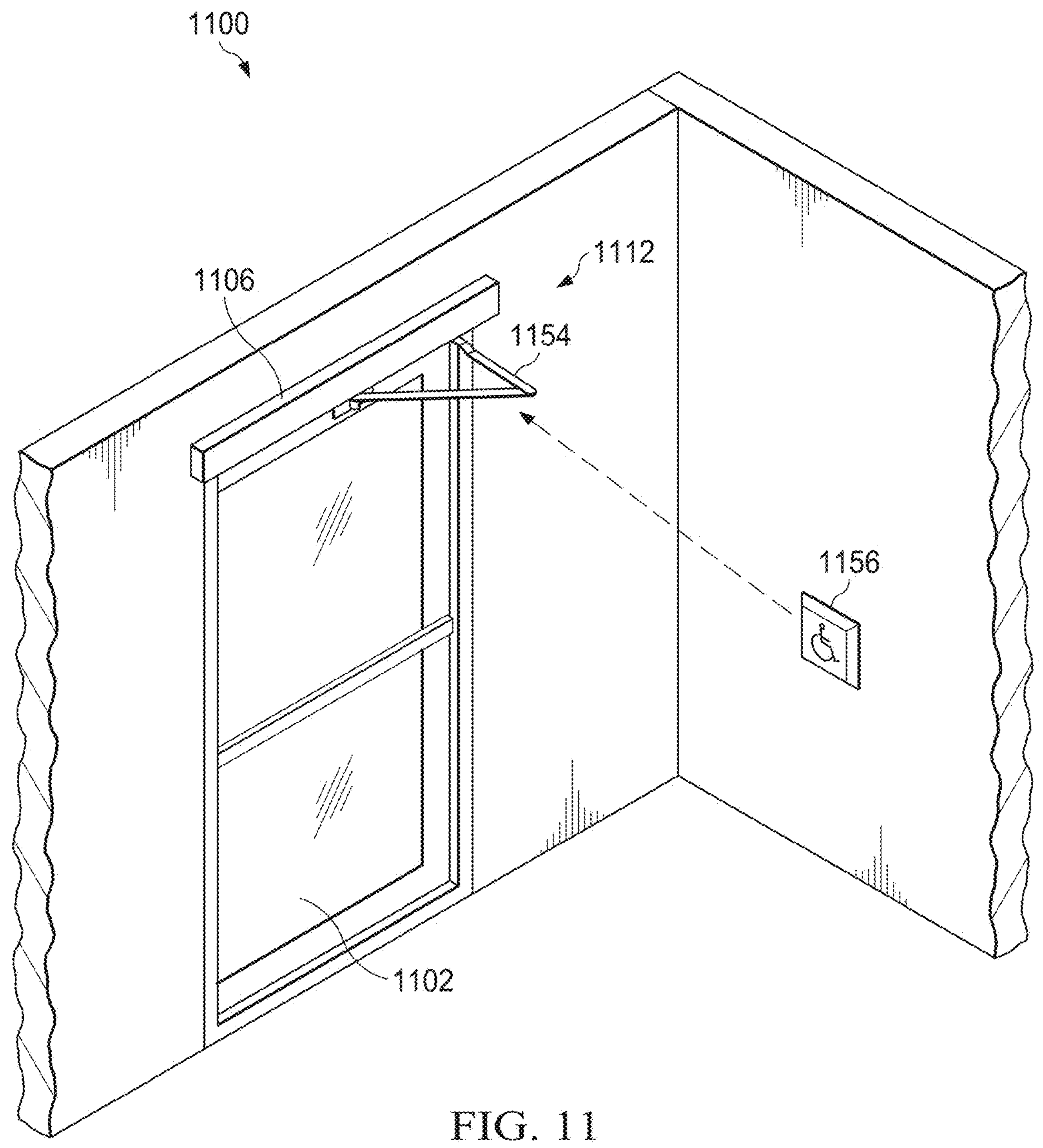
FIG. 11 is a perspective view of a movable barrier system, according to examples of the present disclosure.

FIG. 11 shows a movable barrier system 1100 (e.g., the movable barrier systems 100, 300, 400, 500, 600, 700, and 800). Among other things, the movable barrier system 1100 may include a movable barrier 1102, a header 1106, and a barrier operating system 1112. The movable 1102 may be a handicap accessible door. In this example, the movable barrier 1102 is a swinging door. The barrier operating system 1112 is configured to move the movable barrier 1102 between open and closed positions. This barrier operating system 1112 may move the movable barrier 1102 between the open and closed positions via a swing arm 1154.

In this example, the barrier operating system 1112 also includes at least one handicap switch 1156. The handicap switch 1156 may be a handicap push plate 1156 as shown or may be a button or some other activator that involves displacing a plate or other component relative to the surrounding wall structure. It is understood that other types of switches are usable besides the handicap switch shown, and the shape of the switch 1156 also may be other shapes than the one shown. In some implementations, the push plate of the handicap switch has at least a 4 inch diameter or a minimum of 4 inches by 4 inches square, or for vertical bar push plates, a minimum of two inches wide. Other sizes are contemplated. The handicap switch 1156 is operably coupled to the movable barrier 1102 so that an actuation signal is communicated from the handicap switch 1156 to the barrier operating system 1112. As will be described further below it is advantageous that the handicap switch 1156 be an energy harvesting switch. Furthermore, it is advantageous that the handicap switch 1156 be wireless.

Figure 12:
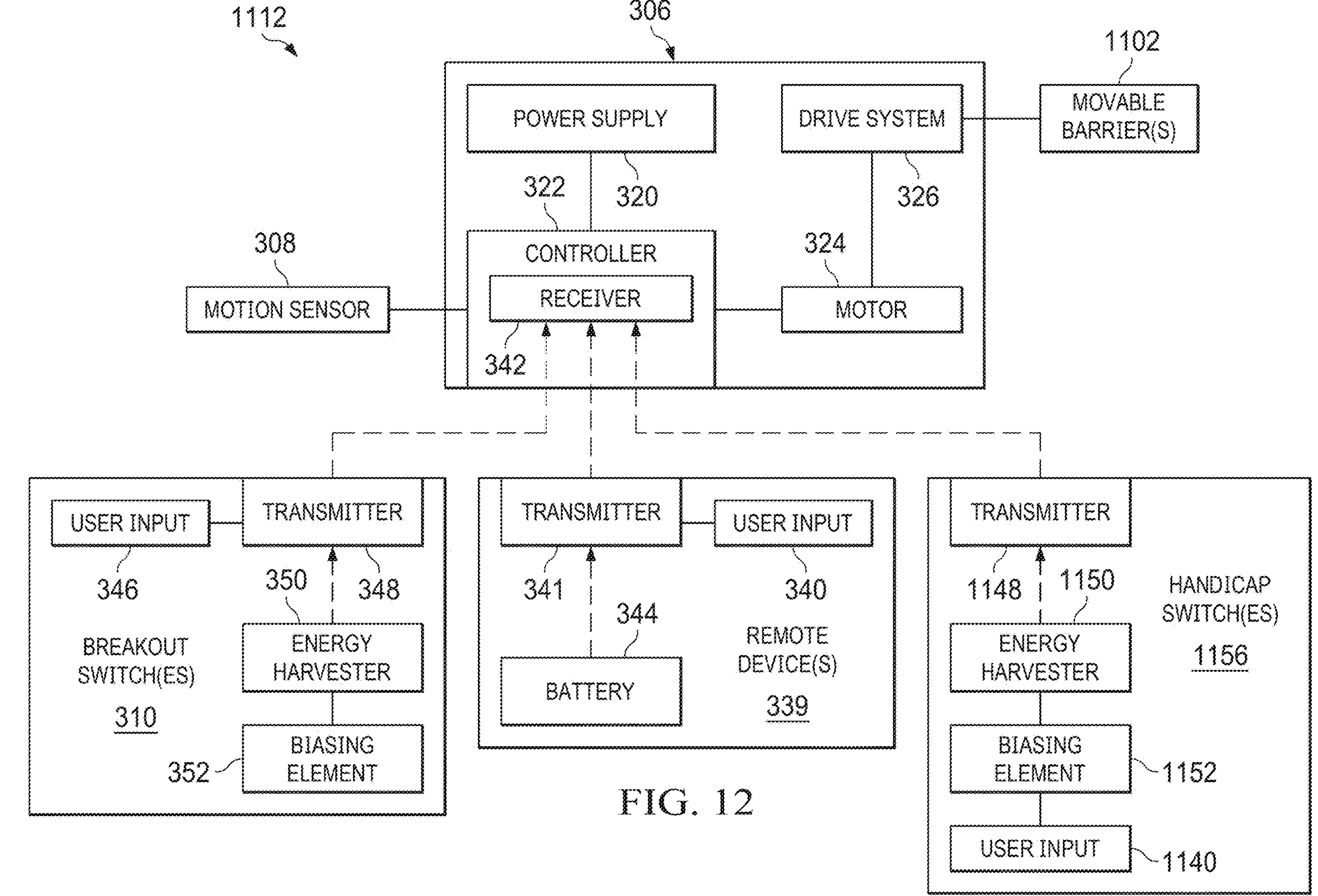
FIG. 12 is a block diagram of a barrier operating system, according to examples of the present disclosure.

FIG. 12 shows a block diagram of a barrier operating system 1112. The barrier operating system 1112 may include some, none, or all of the features of the barrier operating systems previously described. In this way, the barrier operating system 1112 may be the same or similar to the barrier operating system 312 shown in FIG. 3.

The barrier operating system 1112 includes the handicap switch 1156 operably coupled to the movable barrier(s) 1102 as well as a controller (e.g., the controller 322). The controller 322 is configured to receive a signal from the handicap switch 1156. In response to the signal, the controller 322 can change movement of the movable barrier 1102 between open and closed positions. Changing the movement of the movable barrier may include starting the movement, halting the movement, slowing the movement, accelerating the movement, reversing the movement, or pausing the movement. For example, when a user presses the handicap switch 1156, the movable barrier 1102 may begin to open. If the user presses the handicap switch 1156 before the movable barrier 1102 is fully open, the movement of the movable barrier 1102 may pause and or reverse movement. Pressing the handicap switch 1156 when the movable barrier 1102 is fully or partially opened may cause the movable barrier 1102 to close.

It is advantageous to power the handicap switch 1156 with an energy harvester 1150 (e.g., the energy harvester 350). The energy harvester 1150 (e.g., the energy harvester 350) may harvest energy from kinetic energy generated by a biasing element 1152 (e.g., the biasing element 352) when a mechanical force is applied to an input surface of a user input 1140 (e.g., the user inputs 340, 346).

The handicap switch 1156 may include a wired or wireless transmitter 1148 configured to send the signal to change movement of the movable barrier 1102, via a wired or wireless connection, to the receiver 342 located on the controller 322 circuit board. The transmitter 1148 can be powered by a battery as a power source supplemented by the energy harvester 1150. However, it is advantageous in some examples, that the transmitter 1148 be powered solely by the energy harvester 1150, and the handicap switch 1156 be devoid of a power supply except for the energy harvester 1150. For these reasons, the handicap switch 1156 may be an energy harvesting wireless handicap switch. As such, the handicap switches 1156 can be placed at an optimal location in relation to the movable barrier 1102 to accommodate the needs associated with handicap accessibility without or with less consideration of a power supply.

Figure 13:
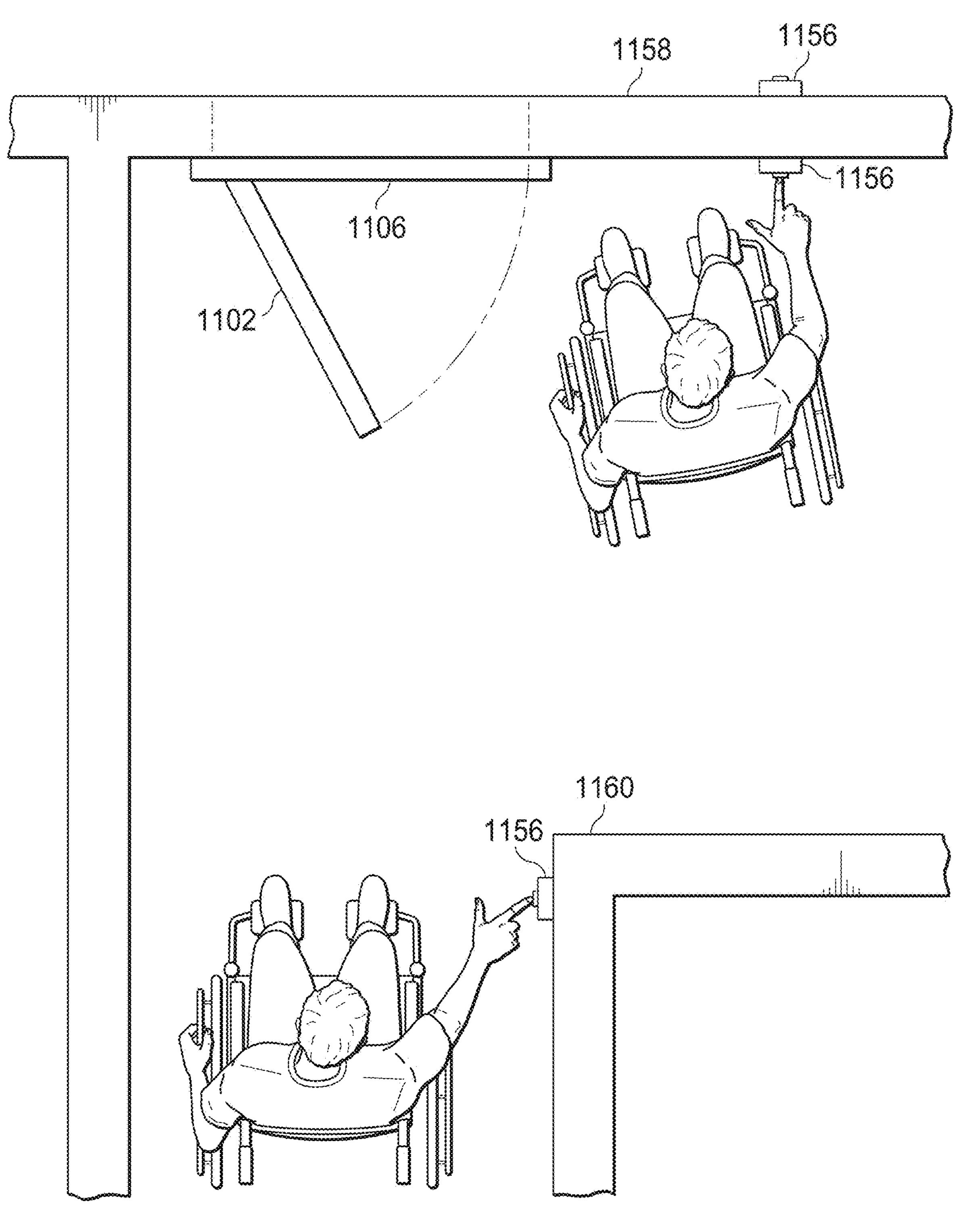
FIG. 13 is a top view of a movable barrier system, according to examples of the present disclosure.

FIG. 13 shows a top view of a movable barrier system (e.g., the movable barrier system 1100) in use by a possible user, according to examples of the present disclosure. This illustration shows the versatility and many advantages that are obtainable using the features of the handicap switches 1156 described herein. Because the handicap switch 1156 may be energy harvesting and because the handicap switch 1156 may be wireless, the handicap can be installed, without wires or batteries, in hard to place locations. For example, FIG. 13 shows the handicap switch 1156 coupled to a wall 1158 adjacent the movable barrier 1102. Because the handicap switch 1156 is an energy harvesting wireless switch, the handicap switch 1156 is mountable on the wall 1158 without wires and without batteries. Because switches for handicap accessible doors are often spaced from the handicap accessible door itself, the energy harvesting wireless handicap switches 1156 described herein make it simple to retrofit a pre-existing door with a handicap compliant switch without needing to alter, access, or re-work the pre-existing walls or ceilings.

Furthermore, the handicap switch 1156 is shown placed on a wall 1160 isolated from the movable barrier 1102. In this example, the wall 1160 is not connected to the wall 1158 or the movable barrier 1102 by other walls. To place a wired switch on the wall 1160 would require wiring running through the ceiling or under the floor. In some examples, the wall 1160 is not connected to the movable barrier 1102 through ceilings either. The features of the handicap switch 1156 allow for placement of the handicap switch 1156 on the wall 1160 without wires or batteries. In some examples, the handicap switch 1156 can be coupled to a movable pedestal or temporary structure, to accommodate all situations.

It is contemplated that the handicap switch 1156 could be placed on the floor or another surface engageable by a disabled or handicapped person. In some examples, the mechanical force applied to the input surface of the handicap switch 1156 is a gravitation force from the weight transferred to the floor through a wheelchair or a force applied by the foot of a person walking over the floor. As such, the handicap switch 1156 is usable in or on the floor without requiring wiring. In this way, the handicap switch 1156 can be accessed by even those without extremities or the ability to apply a mechanical force to a wall-mounted handicap switch 1156.

It is also understood that the handicap switch 1156 can be a remote handicap switch coupled to a wheelchair or other assistive walking device such as a crutch or a walker. In some examples, the handicap switch 1156 is carried by a person. The handicap switch 1156 may be wi-fi enabled, allowing the handicap switch 1156 to communicate with all of the doors within a building or door network.

Figure 14:
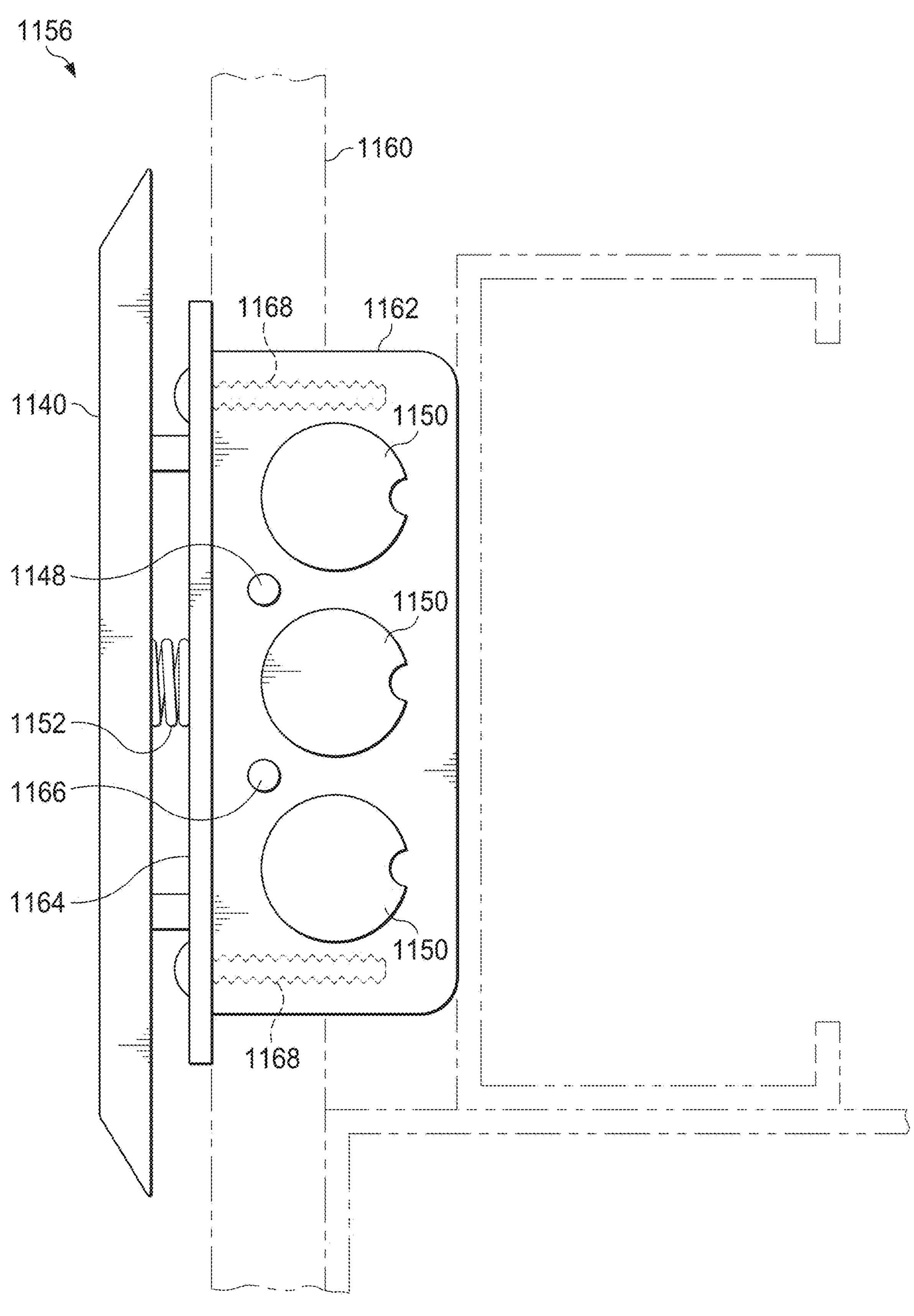
FIG. 14 is a side view of a handicap switch, according to examples of the present disclosure.

FIG. 14 shows a side view of the handicap switch, according to examples of the present disclosure. The handicap switch 1156 may include a base 1162, a base plate 1164, the push plate or user input 1140 including the input surface, at least one of the biasing elements 1152, at least one of the energy harvesters 1150, the transmitter 1148, and a receiver 1166. One or more of these components may be made of a material conducive to transmitting wireless and other communication signals. For example, any of the components of the handicap switch 1156 may be made of plywood, glass, plastic, ceramic, metal, polymer, and composites, among other materials. The base 1162 and the base plate 1164 may be coupled to the wall 1160 via fasteners 1168. In some examples, the handicap switch 1156 is coupled to the wall 1160 without penetrating the wall. For example, the handicap switch 1156 may be adhered to or otherwise fixed to the wall 1160. The handicap switch 1156 may be operably coupled to the movable barrier(s) 1102 via the transmitter 1148 and/or the receiver 1166.

The biasing element 1152 may be a spring as shown. In some examples, the biasing element 1152 is deformed by the mechanical force applied to the user input 1140 to generate kinetic energy. When the biasing element 1152 is a spring or an otherwise flexible material, the biasing element 1152 may compress or uncompress upon application of force to the input surface of the user input 1140.

The energy harvester 1150 is capable of harvesting energy from the kinetic energy generated by the biasing element 1152. In this way, the energy harvester 1150 is configured to convert kinetic energy into electrical energy usable by the transmitter 1148. In some examples, the energy harvester 1150 includes a piezoelectric material deformable by the mechanical force applied to the input surface 1140. The mechanical force compresses or uncompresses the spring so that the kinetic energy in the spring is transferred to the energy harvester 1150, thereby deforming the piezoelectric material. When the piezoelectric material is deformed, the material produces an electric charge. The electric charge can be used immediately or stored until the electrical charge meets a threshold amount. Using the electric charge, the transmitter 1148 transmits at least one signal to the controller 322. In other examples, the energy harvester 1150 includes at least one coil and at least one magnet. The coil or the at least one magnet are movable by the mechanical force applied to the input surface 1140. When the at least one coil and the at least one magnet move with respect to each other, an electric charge is generated within the coil. The electric charge can be used immediately or stored for later use by the transmitter 1148. The transmitter 1148 may wirelessly transmit the signal to the controller 322 when the harvested energy reaches a threshold amount.

The methods described herein are illustrated as a set of operations or processes. Not all the illustrated processes may be performed in all examples of the methods. Additionally, one or more processes that are not expressly illustrated or described may be included before, after, in between, or as part of the example processes. In some examples, one or more of the processes may be performed by a controller and/or may be implemented, at least in part, in the form of executable code stored on non-transitory, tangible, computer or machine-readable media that when run by one or more processors may cause the one or more processors to perform one, some, or all the processes described in relation to the methods herein. Elements illustrated in block diagrams herein may be implemented with hardware, software, firmware, or any combination thereof. One block element being illustrated separate from another block element does not necessarily require that the functions performed by each separate element requires distinct hardware or software but rather they are illustrated separately for the sake of description.

One or more elements in examples of this disclosure may be implemented in software to execute on one or more processors of a computer system such as a controller. When implemented in software, the elements of the examples of the present disclosure are essentially the code segments to perform the necessary tasks. The program or code segments can be stored in a processor readable storage medium or device that may have been downloaded by way of a computer data signal embodied in a carrier wave over a transmission medium or a communication link. The processor readable storage device may include any medium that can store information including an optical medium, semiconductor medium, and magnetic medium. Processor readable storage device examples include an electronic circuit; a semiconductor device, a semiconductor memory device, a read only memory (ROM), a flash memory, an erasable programmable read only memory (EPROM); a floppy diskette, a CD-ROM, an optical disk, a hard disk, or other storage device. The code segments may be downloaded via computer networks such as the Internet, Intranet, etc. Any of a wide variety of centralized or distributed data processing architectures may be employed. Programmed instructions may be implemented as a number of separate programs or subroutines, or they may be integrated into a number of other aspects of the systems described herein. In one example, systems herein support wireless communication protocols such as RF, Bluetooth, IrDA, HomeRF, IEEE 802.11, DECT, and Wireless Telemetry.

In some instances, well-known methods, procedures, components, and circuits have not been described in detail so as not to unnecessarily obscure aspects of the examples. While certain exemplary examples of the present disclosure have been described and shown in the accompanying drawings, it is to be understood that such examples are merely illustrative of and not restrictive on the broad disclosure herein, and that the examples of the present disclosure should not be limited to the specific constructions and arrangements shown and described, since various other modifications may occur to those ordinarily skilled in the art.

What is claimed is:

1. A system comprising:
a movable barrier; and
a barrier operating system configured to move the movable barrier between open and closed positions, the barrier operating system comprising:
a handicap switch operably coupled to the movable barrier and powered by an energy harvester, the handicap switch comprising:
a base;
a push plate; and
a biasing element extending through a surface of the base and comprising a first portion and a second portion, the first portion coupled to the base and the second portion coupled to the push plate, the biasing element configured to transfer kinetic energy to the energy harvester; and
a controller configured to:
receive a signal from the handicap switch; and
change, in response to the signal, movement of the movable barrier between the open and closed positions.

2. The system of claim 1, wherein the change of the movement of the movable barrier includes starting the movement, halting the movement, slowing the movement, accelerating the movement, reversing the movement, or pausing the movement.

3. The system of claim 1, wherein the energy harvester harvests the kinetic energy generated by the biasing element, the kinetic energy resulting from a mechanical force applied to an input surface of the handicap switch.

4. The system of claim 3, wherein the biasing element is deformed by the mechanical force applied to the input surface to generate the kinetic energy.

5. The system of claim 3, wherein the handicap switch is configured to wirelessly transmit the signal to the controller.

6. The system of claim 5, wherein the signal is wirelessly transmitted to the controller before or at the same time as the harvested kinetic energy reaches a threshold amount.

7. The system of claim 1, wherein the handicap switch is coupled to a wall, wherein the wall is isolated from the movable barrier.

8. A method comprising:
moving a movable barrier between open and closed positions using a barrier operating system, the barrier operating system comprising a handicap switch and a controller, the handicap switch operably coupled to the movable barrier and comprising:
a base;
a push plate; and
a biasing element extending through a surface of the base and comprising a first portion and a second portion, the first portion coupled to the base and the second portion coupled to the push plate;
transferring, via the biasing element, kinetic energy to an energy harvester;
powering the handicap switch with the energy harvester;
receiving a signal at the controller from the handicap switch powered by the energy harvester; and
changing, in response to the signal, movement of the movable barrier between the open and closed positions.

9. The method of claim 8, wherein changing the movement of the movable barrier includes starting the movement, halting the movement, slowing the movement, accelerating the movement, reversing the movement, or pausing the movement.

10. The method of claim 8, further comprising harvesting, with the energy harvester, the kinetic energy generated by the biasing element, the kinetic energy resulting from a mechanical force applied to an input surface of the handicap switch.

11. The method of claim 10, wherein the biasing element is deformed by the mechanical force applied to the input surface to generate the kinetic energy.

12. The method of claim 10, further comprising wirelessly transmitting the signal to the controller with the handicap switch.

13. The method of claim 12, wherein the signal is transmitted to the controller before or at the same time as the harvested kinetic energy reaches a threshold amount.

14. A handicap switch operably couplable to a movable barrier movable by a barrier operating system between open and closed positions, the barrier operating system comprising a controller, the handicap switch comprising:
an energy harvester configured to convert kinetic energy into electrical energy;
a base;
a push plate;
a biasing element extending through a surface of the base and comprising a first portion and a second portion, the first portion coupled to the base and the second portion coupled to the push plate, the biasing element configured to transfer the kinetic energy to the energy harvester; and a transmitter powered by the electrical energy and configured to wirelessly send a signal to the controller.

15. The handicap switch of claim 14, wherein the biasing element is configured to generate the kinetic energy, the kinetic energy resulting from a mechanical force applied to an input surface of the handicap switch.

16. The handicap switch of claim 15, wherein the energy harvester includes a piezoelectric material deformable by the mechanical force applied to the input surface to generate the electrical energy.

17. The handicap switch of claim 15, wherein the energy harvester includes a coil and at least one magnet movable by the mechanical force applied to the input surface to generate the electrical energy.

18. The handicap switch of claim 14, wherein the transmitter is further configured to wirelessly send the signal to cause the controller to change movement of the movable barrier between the open and closed positions, and wherein the change of the movement of the movable barrier includes starting the movement, halting the movement, slowing the movement, accelerating the movement, reversing the movement, or pausing the movement.

19. The handicap switch of claim 14, wherein the transmitter is further configured to wirelessly send the signal to the controller before or at the same time as the harvested kinetic energy reaches a threshold amount.

20. The handicap switch of claim 14, wherein the handicap switch is configured to be coupled to a wall isolated from the movable barrier.

* * * * *